United States Patent
Kang et al.

(10) Patent No.: US 12,470,743 B2
(45) Date of Patent: *Nov. 11, 2025

(54) METHOD AND APPARATUS FOR ENCODING AND DECODING VIDEO USING INTER-PREDICTION

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/792,359

(22) Filed: Aug. 1, 2024

(65) Prior Publication Data
US 2024/0397085 A1 Nov. 28, 2024

Related U.S. Application Data

(63) Continuation of application No. 17/767,013, filed as application No. PCT/KR2020/012976 on Sep. 24, 2020, now Pat. No. 12,088,839.

(30) Foreign Application Priority Data

Oct. 6, 2019 (KR) .......... 10-2019-0123491
Dec. 2, 2019 (KR) .......... 10-2019-0158564
Sep. 24, 2020 (KR) .......... 10-2020-0123619

(51) Int. Cl.
H04N 19/577 (2014.01)
H04N 19/105 (2014.01)
(Continued)

(52) U.S. Cl.
CPC ......... H04N 19/577 (2014.11); H04N 19/105 (2014.11); H04N 19/139 (2014.11); H04N 19/176 (2014.11)

(58) Field of Classification Search
CPC .. H04N 19/105; H04N 19/139; H04N 19/176; H04N 19/513; H04N 19/577
See application file for complete search history.

(56) References Cited

U.S. PATENT DOCUMENTS

2014/0269909 A1 9/2014 Oh et al.
2019/0124332 A1 4/2019 Lim
(Continued)

FOREIGN PATENT DOCUMENTS

KR 20130050407 A 5/2013
WO 2017171107 A1 10/2017
WO 2018066927 A1 4/2018

OTHER PUBLICATIONS

"Two-Pass Bi-Directional Optical Flow via Motion Vector Refinement"—Hongbin Liu, Li Zhang, Kai Zhang, Hsiao Chiang Chuang, Yue Wang, Jizheng Xu; 978-1-5386-6249-6/19/$31.00 Â© 2019 IEEE (Year: 2019).*

(Continued)

Primary Examiner — Mainul Hasan
(74) Attorney, Agent, or Firm — Lempia Summerfield Katz LLC

(57) ABSTRACT

A video decoding method, a video encoding method, and a method of transmitting a bitstream containing encoded video (Continued)

data are disclosed. The methods include determining first and second reference pictures and first and second motion vectors for bi-prediction by decoding a bitstream; generating a first reference block from the first reference picture referenced by the first motion vector and generating a second reference block from the second reference picture referenced by the second motion vector; and generating a prediction block of the target block using the first and second reference blocks. The methods also include generating a residual block of the target block and reconstructing the target block based on the prediction block of the target block and the residual block of the target block.

11 Claims, 13 Drawing Sheets

(51) Int. Cl.
　　*H04N 19/139*　　(2014.01)
　　*H04N 19/176*　　(2014.01)

(56) References Cited

U.S. PATENT DOCUMENTS

| | | | | |
|---|---|---|---|---|
| 2019/0238880 | A1* | 8/2019 | Lee | H04N 19/573 |
| 2020/0045307 | A1 | 2/2020 | Jang | |
| 2020/0204807 | A1* | 6/2020 | Ye | H04N 19/109 |
| 2020/0304827 | A1* | 9/2020 | Abe | H04N 19/573 |
| 2021/0368198 | A1* | 11/2021 | Zhang | H04N 19/176 |
| 2022/0014775 | A1* | 1/2022 | Lee | H04N 19/176 |
| 2022/0385897 | A1* | 12/2022 | Chen | H04N 19/82 |
| 2023/0028629 | A1* | 1/2023 | Park | H04N 19/137 |
| 2023/0262253 | A1* | 8/2023 | Lee | H04N 19/159 |
| | | | | 375/240.12 |

OTHER PUBLICATIONS

Bross, Benjamin el al.; "Versatile Video Coding (Draft 6)"; Joint Video Experts Team (JVET) of ITU-T SG 16 WP 3 and SO/IEC JTC 1/SC 29/WG 11; 15th Meeting: Gothenburg, SE; Jul. 3-12, 2019 (457 pages).

Chen, Jianle et al.; "Algorithm description for Versatile Video Coding and Test Model Meeting: 6 (VTM 6)"; Joint Video Experts Team (JVET) of ITU-T SG 16 WP 3 and ISO/IEC JTC 1/SC 29/WG 11; 15th Meeting: Gothenburg, SE; Jul. 3-12, 2019 (89 pages).

Hongbin Liu et al.; Two-Pass Bi-Directional Optical Flow via Motion Vector Refinement; 2019 IEEE International Conference on Image Processing (ICIP); 2019; 99 1208-1211.

International Search Report issued in related Application No. PCT/KR2020/012976; Dec. 30, 2020; (7 pages).

\* cited by examiner

- 4x4 subblock
- - - 6x6 window
- → sample & gradient padding

METHOD AND APPARATUS FOR ENCODING AND DECODING VIDEO USING INTER-PREDICTION

CROSS-REFERENCE TO RELATED APPLICATIONS

This application is a continuation of non-provisional U.S. patent application Ser. No. 17/767,013 filed Apr. 6, 2022 and entitled "METHOD AND APPARATUS FOR ENCODING AND DECODING VIDEO USING INTER-PREDICTION", which is a U.S. national stage of International Application No. PCT/KR2020/012976, filed on Sep. 24, 2020, which claims priority to Korean Patent Application No. 10-2019-0123491, filed on Oct. 6, 2019, Korean Patent Application No. 10-2019-0158564, filed on Dec. 2, 2019, and Korean Patent Application No. 10-2020-0123619, filed on Sep. 24, 2020, the entire contents of which are incorporated herein by reference.

TECHNICAL FIELD

The present disclosure relates to encoding and decoding of a video, and more particularly, to a coding tool for improving the compression performance of inter-prediction.

BACKGROUND

Since the volume of video data is larger than that of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the picture size, resolution, and frame rate are gradually increasing, and thus the amount of data to be encoded is also increasing. Accordingly, a new compression technique having better encoding efficiency and higher image quality than the existing compression technique is required.

In video encoding, predictive encoding is mainly used to improve compression performance. Prediction includes intra-prediction for predicting a target block to be encoded based on pre-reconstructed samples in a current picture and includes inter-prediction for predicting a current block using a pre-reconstructed reference picture. In particular, the inter-prediction is widely used for video encoding because it exhibits superior compression performance compared to intra-prediction.

The present disclosure proposes a coding tool for improving the compression performance of the existing inter-prediction.

SUMMARY

The present disclosure provides a coding tool for improving compression performance of inter-prediction. As an aspect, the present disclosure relates to a coding tool capable of compensating for various motions of an object, as well as a translation motion in units of blocks.

In accordance with one aspect of the present disclosure, a video decoding apparatus is provided for predicting a target block in a current picture to be decoded. The apparatus comprises a predictor configured to determine first and second reference pictures and first and second motion vectors for bi-prediction by decoding a bitstream. The predictor is also configured to generate a first reference block from the first reference picture referenced by the first motion vector and generate a second reference block from the second reference picture referenced by the second motion vector. The predictor is also configured to generate a prediction block of the target block using the first and second reference blocks. The predictor includes a first coding tool configured to generate the prediction block of the target block by performing a bi-directional optical flow process using the first and second reference blocks. Herein, the first coding tool is not executed when luma weights assigned to each of the first and second reference pictures for prediction of a luma component of the target block are different from each other. In addition, the first coding tool is not executed when chroma weights assigned to each of the first and second reference pictures for prediction of a chroma component of the target block are different from each other.

In accordance with another aspect of the present disclosure, a video encoding apparatus is provided for inter-predicting a target block in a current picture to be encoded. The apparatus comprises a predictor configured to: determine a first motion vector and a second motion vector for bi-direction; generate a first reference block from the first reference picture referenced by the first motion vector and generate a second reference block from the second reference picture referenced by the second motion vector; and generate a prediction block of the target block using the first and second reference blocks. The predictor includes a first coding tool configured to generate the prediction block of the target block by performing a bi-directional optical flow using the first and second reference blocks. Herein, the first coding tool is not executed when luma weights assigned to each of the first and second reference pictures for prediction of a luma component of the target block are different from each other. Also, the first coding tool is also executed when chroma weights assigned to each of the first and second reference pictures for prediction of a chroma component of the target block are different from each other.

In accordance with another aspect of the present disclosure, a method for predicting a target block in a current picture is provided. The method includes: determining a first motion vector and a second motion vector for bi-direction; generating a first reference block from a first reference picture referenced by the first motion vector and generate a second reference block from a second reference picture referenced by the second motion vector; and predicting the target block using the first and second reference blocks. The predicting of the target block includes: executing a first coding tool configured to generate a prediction block of the target block by performing a bi-directional optical flow process using the first and second reference blocks. Herein, the first coding tool is not executed when luma weights assigned to each of the first and second reference pictures for prediction of a luma component of the target block are different from each other. In addition, the first coding tool is not executed when chroma weights assigned to each of the first and second reference pictures for prediction of a chroma component of the target block are different from each other.

DETAILED DESCRIPTION

Figure 1:
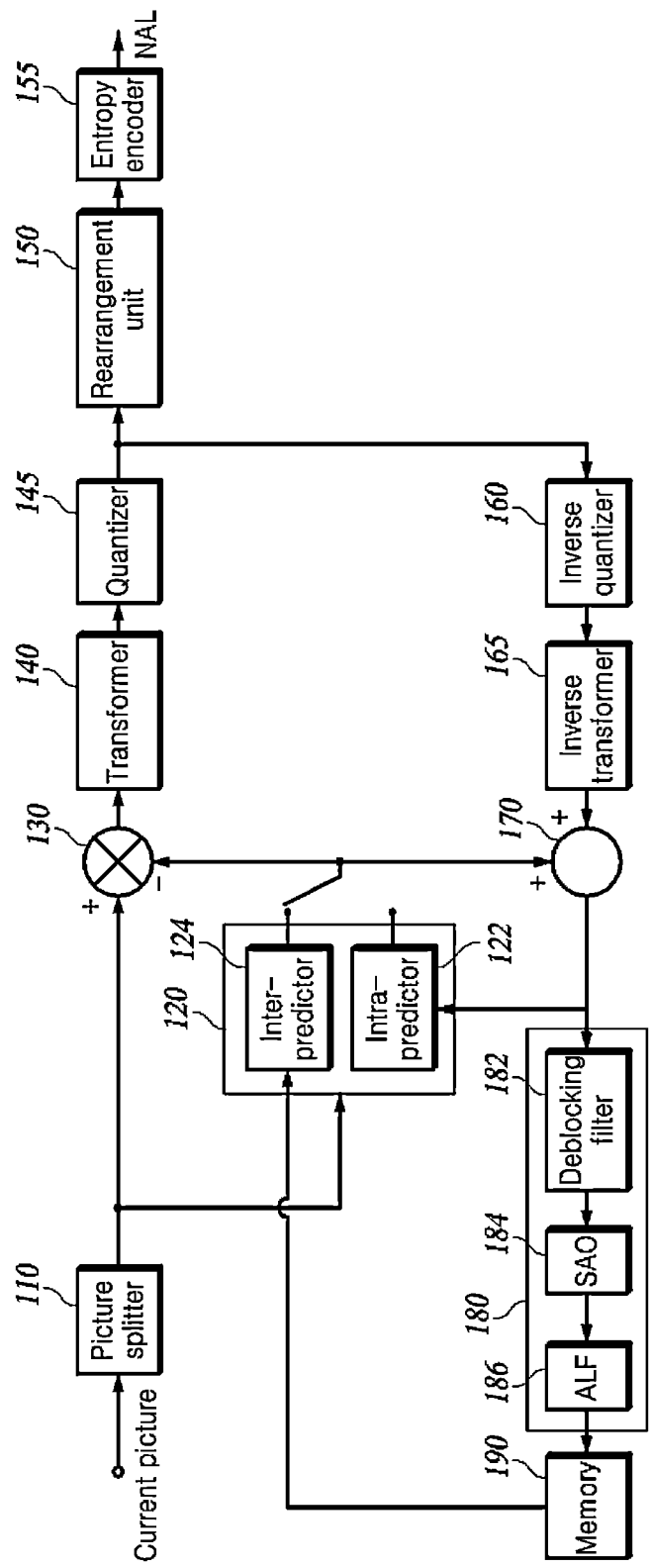
FIG. 1 is a block diagram of a video encoding apparatus capable of implementing the techniques of the present disclosure.

Hereinafter, some embodiments of the present disclosure are described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein has been omitted to avoid obscuring the subject matter of the present disclosure. When a component, device, element, or the like of the present disclosure is described as having a purpose or performing an operation, function, or the like, the component, device, or element should be considered herein as being "configured to" meet that purpose or to perform that operation or function.

FIG. 1 is a block diagram of a video encoding apparatus capable of implementing the techniques of the present disclosure. Hereinafter, a video encoding apparatus and elements of the apparatus are described with reference to FIG. 1.

The video encoding apparatus includes a block splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each element of the video encoding apparatus may be implemented in hardware or software, or a combination of hardware and software. The functions of the respective elements may be implemented as software and a microprocessor may be implemented to execute the software functions corresponding to the respective elements.

One video is composed of one or more sequences including a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU and information applied to CUs included in one CTU in common is encoded as a syntax of the CTU. In addition, information applied to all blocks in one slice in common is encoded as a syntax of a slice header and information applied to all blocks constituting one or more pictures is encoded in a picture parameter set (PPS) or a picture header. Furthermore, information, which a sequence composed of a plurality of pictures refers to in common, is encoded in a sequence parameter set (SPS). In addition, information applied to one tile or tile group in common may be encoded as a syntax of a tile or tile group header. The syntaxes included in the SPS, PPS, slice header, and tile or tile group header may be referred to as high-level syntaxes.

Each of the plurality of pictures may be split into a plurality of subpictures that can be independently encoded/decoded and/or independently displayed. When subpicture splitting is applied, information on a layout of subpictures in a picture is signaled.

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting the video into a plurality of CTUs having a predetermined size and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size. The tree structure may be a Binary Tree (BT), in which a node is split into two sub-nodes. The tree structure may be a TernaryTree (TT), in which a node is split into three sub-nodes at a ratio of 1:2:1. The tree structure may be a structure formed by a combination of two or more of the QT structure, the BT structure, and the TT structure. For example, a QuadTree plus BinaryTree (QTBT) structure may be used, or a QuadTree plus Binary Tree TernaryTree (QTBTTT) structure may be used. Here, BTTT may be collectively referred to as a multiple-type tree (MTT).

Figure 2:
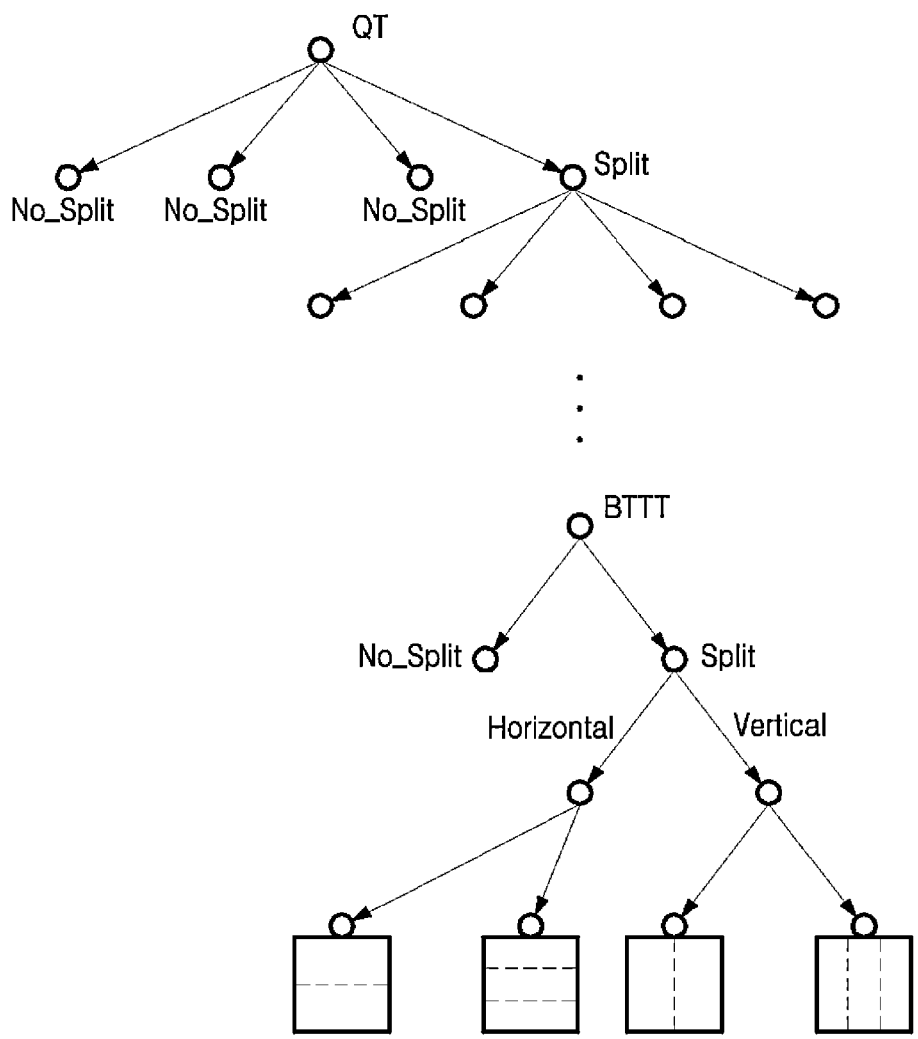
FIG. 2 shows block partitioning structure using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types including a type of horizontally splitting a block into two blocks of the same size (i.e., symmetric horizontal splitting) and including a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

Figure 3:
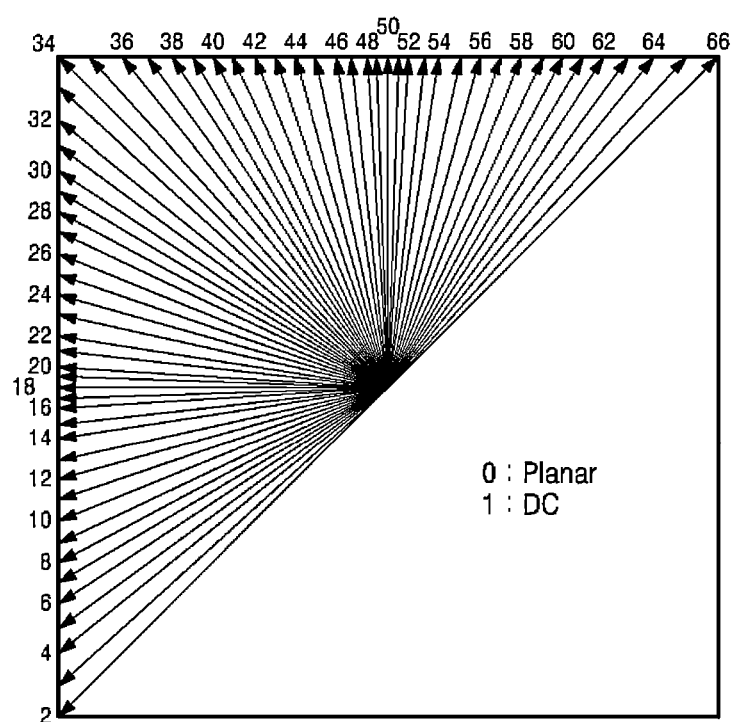
FIG. 3 shows a plurality of intra-prediction modes.

The intra-prediction unit 122 predicts samples in the current block using samples (reference samples) positioned around the current block in the current picture including the current block. There is a plurality of intra-prediction modes according to the prediction directions. For example, as shown in FIG. 3, the plurality of intra-prediction modes may include two non-directional modes, which include a planar mode and a DC mode, and 65 directional modes. Neighboring samples and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes and may select an intra-prediction mode that has the best rate distortion characteristics among the tested modes.

The intra-predictor 122 selects one intra-prediction mode from among the plurality of intra-prediction modes and predicts the current block using neighboring pixels (reference pixel) and an equation determined according to the selected intra-prediction mode. Information about the selected intra-prediction mode is encoded by the entropy encoder 155 and transmitted to the video decoding apparatus.

The inter-predictor 124 generates a prediction block for the current block through a motion compensation. The inter-predictor 124 searches for a block most similar to the current block in a reference picture, which has been encoded and decoded earlier than the current picture. The inter-predictor 124 generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The inter-predictor 124 may perform interpolation on a reference picture or a reference block in order to increase prediction accuracy. In other words, subsamples between two consecutive integer samples are interpolated by applying filter coefficients to a plurality of consecutive integer samples including the two integer samples. When the operation of searching for a block most similar to the current block is performed on the interpolated reference picture, the motion vector may be expressed at a precision level of fractional sample unit, not a precision level of integer sample unit. The precision or resolution of the motion vector may be set differently for each target region to be encoded, for example, each unit such as a slice, tile, CTU, or CU. When such an adaptive motion vector resolution is applied, information about motion vector resolution to be applied to each target region should be signaled for each target region. For example, when the target region is a CU, information about the motion vector resolution applied to each CU is signaled.

The inter-predictor 124 may perform inter-prediction using bi-prediction. In bi-directional prediction, the inter-predictor 124 uses two reference pictures and two motion vectors representing block positions most similar to the current block in the respective reference pictures. The inter-predictor 124 selects a first reference picture and a second reference picture from reference picture list 0 (RefPicList0) and reference picture list 1 (RefPicList1), respectively, searches for blocks similar to the current block in the respective reference pictures and generates a first reference block and a second reference block. Then, the inter-predictor 124 generates a prediction block for the current block by averaging the first reference block and the second reference block. Then, the inter-predictor 124 transfers motion information including information about the two reference pictures and the two motion vectors used to predict the current block to the encoder 150. Here, RefPicList0 may be composed of pictures preceding the current picture in display order among the reconstructed pictures, and RefPicList1 may be composed of pictures following the current picture in display order among the reconstructed pictures. However, embodiments are not limited thereto. Pre-reconstructed pictures following the current picture in display order may be further included in RefPicList0. Conversely, pre-reconstructed pictures preceding the current picture may be further included in RefPicList1.

The inter-predictor 124 may perform bidirectional prediction, so-called weighted bi-prediction, using a weighted average. The inter-predictor 124 determines weights respectively applied to the first reference picture and the second reference picture. The weight assigned to the first reference picture is applied to blocks in the first reference picture, and the weight assigned to the second reference picture is applied to blocks in the second reference picture. The inter-predictor 124 applies the weight assigned to the first reference picture to the first reference block and applies the weight assigned to the second reference picture to the second reference block. A final prediction block of a target block through weighted sum or weighted average operation of the first reference block and the second reference block may be generated. Weight information for reference pictures used in inter-prediction is signaled to the video decoding apparatus.

Meanwhile, the weight used to predict the luma component and the weight used to predict the chroma component may be independently determined. In this case, information on the luma weight to be applied to the luma component and information on the chroma weight to be applied to the chroma component are respectively signaled.

Motion information (motion vector, reference picture) used for inter-prediction should be signaled to the video decoding apparatus. Various methods may be used to minimize the number of bits required to encode the motion information.

For example, when the reference picture and motion vector of the current block are the same as the reference picture and motion vector of a neighboring block, the motion information about the current block may be transmitted to the decoding apparatus by encoding information for identifying the neighboring block. This method is called a "merge mode."

In the merge mode, the inter-predictor 124 selects a predetermined number of merge candidate blocks (hereinafter referred to as "merge candidates") from among the neighboring blocks of the current block.

Figure 4:
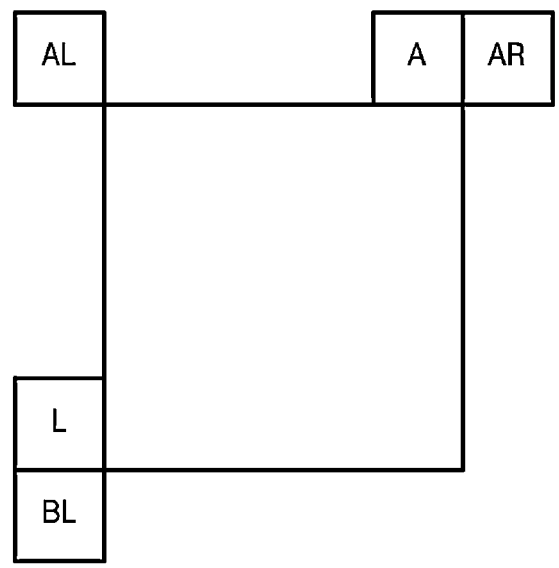
FIG. 4 shows neighboring blocks around a current block.

As illustrated in FIG. 4, all or part of a left block L, an above block A, an above right block AR, a bottom left block BL, and an above left block AL, which are adjacent to the current block in the current picture, may be used as neighboring blocks for deriving merge candidates. In addition, a block located within a reference picture (which may be the same as or different from the reference picture used to predict the current block) other than the current picture in which the current block is located may be used as a merge candidate. For example, a co-located block, which is at the same position as the current block or blocks adjacent to the co-located block in the reference picture, may be additionally used as merge candidates.

The inter-predictor 124 configures a merge list including a predetermined number of merge candidates using such neighboring blocks. The inter-predictor 124 selects a merge candidate to be used as the motion information about the current block from among the merge candidates included in the merge list and generates merge index information for identifying the selected candidates. The generated merge index information is encoded by the encoder 155 and transmitted to the decoding apparatus.

Another method of encoding the motion information is an AMVP mode.

In the AMVP mode, the inter-predictor 124 derives predicted motion vector candidates for the motion vector of the current block by using neighboring blocks of the current block. All or part of the left block L, the above block A, the above right block AR, the bottom left block BL, and the above left block AL, which are adjacent to the current block in the current picture in FIG. 2, may be used as the neighboring blocks used to derive the predicted motion vector candidates. In addition, a block positioned within a reference picture (which may be the same as or different from the reference picture used to predict the current block) other than the current picture including the current block may be used as the neighboring blocks used to derive the predicted motion vector candidates. For example, a co-located block, which is at the same position as the current block or blocks adjacent to the co-located block in the reference picture may be used.

The inter-predictor 124 derives predicted motion vector candidates using the motion vectors of the neighboring blocks and determines a predicted motion vector for the motion vector of the current block using the predicted motion vector candidates. Then, a motion vector difference is calculated by subtracting the predicted motion vector from the motion vector of the current block.

The predicted motion vector may be obtained by applying a predefined function (e.g., a function for calculating a median, an average, or the like) to the predicted motion vector candidates. In this case, the video decoding apparatus also knows the predefined function. Since the neighboring blocks used to derive the predicted motion vector candidates have already been encoded and decoded, the video decoding apparatus already knows the motion vectors of the neighboring blocks as well. Accordingly, the video encoding apparatus does not need to encode information for identifying the predicted motion vector candidates. Therefore, in this case, the information about the motion vector difference and the information about the reference picture used to predict the current block are encoded.

The predicted motion vector may be determined by selecting any one of the predicted motion vector candidates. In this case, information for identifying the selected predicted motion vector candidate is further encoded along with the information about the motion vector difference and the information about the reference picture which are to be used to predict the current block.

The subtractor 130 subtracts the prediction block generated by the intra-predictor 122 or the inter-predictor 124 from the current block to generate a residual block.

The transformer 140 may transform the residual signals in the residual block. A two-dimensional (2D) size of the residual block may be used as a transform unit (hereinafter, 'TU'), which is a block size for performing transform. Alternatively, the residual block may be divided into a plurality of subblocks and residual signals in the corresponding subblock may be transformed by using each subblock as a TU.

The transformer 140 may split the residual block into one or more subblocks, and may apply the transformation to the one or more subblocks. The residual values of the transform blocks may thereby be transformed from the pixel domain to the frequency domain. In the frequency domain, the transformed blocks are referred to as coefficient blocks or transform blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may transform the residual block in the horizontal direction and the vertical direction individually. For transformation, various types of transform kernels or transform matrices may be used. For example, pairs of transform kernels for horizontal transformation and vertical transformation may be defined as a multiple transform set (MTS). The transformer 140 may select one pair of transform kernels having the best transformation efficiency in the MTS and transform the residual block in the horizontal and vertical directions, respectively. The information (mts_idx) on the transform kernel pair selected in the MTS is encoded by the entropy encoder 155 and signaled to the video decoding apparatus.

The quantizer 145 quantizes transform coefficients output from the transformer 140 using quantization parameters and outputs the quantized transform coefficients to the entropy encoder 155. For some blocks or frames, the quantizer 145 may directly quantize a related residual block without transformation. The quantizer 145 may apply different quantization coefficients (scaling values) according to the positions of the transform coefficients in a transform block. A matrix of quantized coefficients applied to the two-dimensionally arranged quantized transform coefficients may be encoded and signaled to the video decoding apparatus.

The rearrangement unit 150 may re-sort the coefficient values for the quantized residual value. The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan in which a two-dimensional array of coefficients is scanned in a column direction, or a horizontal scan in which two-dimensional block-shaped coefficients are scanned in a row direction may be used instead of the zig-zag scan. In other words, a scan mode to be used may be determined among the zig-zag scan, the diagonal scan, the vertical scan, and the horizontal scan according to the size of the transformation unit and the intra-prediction mode.

The entropy encoder 155 encodes the one-dimensional quantized transform coefficients output from the rearrangement unit 150 using various encoding techniques such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction. The entropy encoder 155 also encodes intra-prediction information (i.e., information about an intra-prediction mode) or inter-prediction information (a merge index for the merge mode, information about a reference picture index and a motion vector difference for the AMVP mode) according to the prediction type. The entropy encoder 155 also encodes information related to quantization, i.e., information about quantization parameters and information about a quantization matrix.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The samples in the reconstructed current block are used as reference samples in performing intra-prediction of a next block.

The loop filter unit 180 filters the reconstructed samples to reduce blocking artifacts, ringing artifacts, and blurring artifacts generated due to block-based prediction and transformation/quantization. The loop filter unit 180 may include at least one of a deblocking filter 182, a sample adaptive offset (SAO) filter 184, or an adaptive loop filter (ALF) 186.

The deblocking filter 182 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed sample and an original sample caused by lossy coding and performs filtering in a manner that adding a corresponding offset to each reconstructed sample. The ALF 186 performs filtering on a target sample to be filtered by applying filter coefficients to the target sample and neighboring samples of the target sample. The ALF 186 may divide the samples included in a picture into predetermined groups and then determine one filter to be applied to a corresponding group to differentially perform filtering on each group. Information about filter coefficients to be used for the ALF may be encoded and signaled to the video decoding apparatus.

The reconstructed blocks filtered through the loop filter unit 180 are stored in the memory 190. Once all blocks in one picture are reconstructed, the reconstructed picture may be used as a reference picture for inter-prediction of blocks in a picture to be encoded next.

Figure 5:
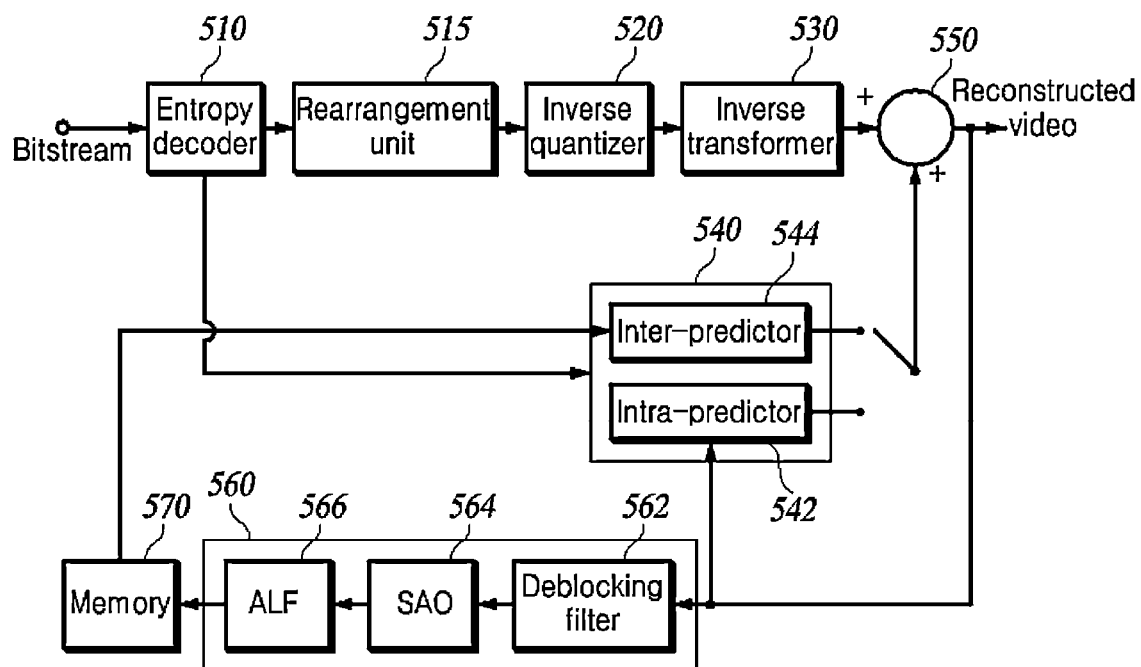
FIG. 5 is a block diagram of a video decoding apparatus capable of implementing the techniques of the present disclosure.

FIG. 5 is a functional block diagram of a video decoding apparatus capable of implementing the techniques of the present disclosure. Hereinafter, the video decoding apparatus and elements of the apparatus are described with reference to FIG. 5.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 510 determines a current block to be decoded by decoding a bitstream generated by the video encoding apparatus and extracting information related to block splitting and extracts prediction information and information about a residual signal, and the like required to reconstruct the current block.

The entropy decoder 510 extracts information about the CTU size from the sequence parameter set (SPS) or the picture parameter set (PPS), determines the size of the CTU, and splits a picture into CTUs of the determined size. Then, the decoder determines the CTU as the uppermost layer, i.e., the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thus, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 510 extracts information about a prediction type indicating whether the current block is intra-predicted or inter-predicted. When the prediction type information indicates intra-prediction, the entropy decoder 510 extracts a syntax element for the intra-prediction information (intra-prediction mode) for the current block. When the prediction type information indicates inter-prediction, the entropy decoder 510 extracts a syntax element for the inter-prediction information, i.e., information indicating a motion vector and a reference picture referred to by the motion vector.

The entropy decoder 510 also extracts information about quantized transform coefficients of the current block as information related to quantization and information about residual signals.

The rearrangement unit 515 may change the sequence of the one-dimensional quantized transform coefficients entropy-decoded by the entropy decoder 510 to a 2-dimensional coefficient array (i.e., block) in a reverse order of the coefficient scanning performed by the video encoding apparatus.

The inverse quantizer 520 inversely quantizes the quantized transform coefficients using the quantization parameter. The inverse quantizer 520 may apply different quantization coefficients (scaling values) to the quantized transform coefficients arranged in two dimensions. The inverse quantizer 520 may perform inverse quantization by applying a matrix of quantization coefficients (scaling values) from the video encoding apparatus to a two-dimensional array of quantized transform coefficients.

The inverse transformer 530 inversely transforms the inversely quantized transform coefficients from the frequency domain to the spatial domain to reconstruct residual signals. Thus, a reconstructed residual block for the current block may be generated. In addition, when the MTS is applied, the inverse transformer 530 determines transform functions or transform matrices to be applied in the horizontal and vertical directions, respectively, using the MTS information (mts_idx) signaled from the video encoding apparatus, and uses the determined transform functions to inversely transform the transform coefficients in the transform block in the horizontal and vertical directions.

The predictor 540 may include an intra-predictor 542 and an inter-predictor 544. The intra-predictor 542 is activated when the prediction type of the current block is intra-prediction, and the inter-predictor 544 is activated when the prediction type of the current block is inter-prediction.

The intra-predictor 542 determines an intra-prediction mode of the current block among a plurality of intra-prediction modes based on the syntax element for the intra-prediction mode extracted from the entropy decoder 510, and predicts the current block using the reference samples around the current block according to the intra-prediction mode.

The inter-predictor 544 determines a motion vector of the current block and a reference picture referred to by the motion vector using the syntax element for the inter-prediction extracted from the entropy decoder 510 and predicts the current block based on the motion vector and the reference picture.

The inter-predictor 544 may generate a prediction block of the current block using bi-directional prediction, similarly to the inter predictor 124 of the video encoding apparatus. When weighted bidirectional prediction is applied, the entropy decoder 510 extracts weight information applied to two reference pictures to be used for bidirectional prediction of the current block from the bitstream. The weight information may include weight information to be applied to the luma component and weight information to be applied to the chroma component. The inter-predictor 544 generates a prediction block for the luma component and a prediction block for the chroma component of the current block using the weight information.

The adder 550 reconstructs the current block by adding the residual block output from the inverse transformer and the prediction block output from the inter-predictor or the intra-predictor. The samples in the reconstructed current block are used as reference samples in intra-predicting a block to be decoded next.

The loop filter unit 560 may include at least one of a deblocking filter 562, an SAO filter 564, or an ALF 566. The deblocking filter 562 deblocking-filters the boundary between the reconstructed blocks to remove blocking artifacts caused by block-by-block decoding. The SAO filter 564 performs filtering in a manner of adding the reconstructed block after deblocking filtering to corresponding offsets so as to compensate for a difference between the reconstructed sample and the original sample caused by lossy coding. The ALF 566 performs filtering on a target sample to be filtered by applying filter coefficients to the target sample and neighboring samples of the target sample. The ALF 566 may divide the samples in a picture into predetermined groups and then determine one filter to be applied to a corresponding group to differentially perform filtering on each group. The filter coefficient of the ALF is determined based on the information about the filter coefficient decoded from the bitstream.

The reconstructed block filtered through the loop filter unit 560 is stored in the memory 570. When all blocks in one picture are reconstructed, the reconstructed picture is used as a reference picture for inter-prediction of blocks in a picture to be encoded next.

The following disclosure relates to coding tools for improving compression performance of inter-prediction, which may be operated by the inter-predictor 124 of the video encoding apparatus and the inter-predictor 544 of the video decoding apparatus. As used herein, the term "target block" may have the same meaning as the terms "current block" or "coding unit (CU)" used above or may mean a partial region of a CU.

I. Combined Inter/Intra-Prediction

As described above, the target block is predicted through one of inter-prediction and intra-prediction. Combined inter/intra-prediction described in the present disclosure is a technique of complementing an inter-prediction signal using an intra-prediction signal. When the combined inter/intra-prediction is applied, the inter-predictor 124 of the video encoding apparatus determines a motion vector of the target block and predicts the target block using the determined motion vector to generate an inter-prediction block. The intra-predictor 124 of the video encoding apparatus predicts the target block using reference samples around the target block and generates an intra-prediction block. As the intra-prediction mode used to generate the intra-prediction block, any one of the plurality of intra-prediction modes described above may be fixedly used. For example, the planar mode or the DC mode may be used as a prediction mode for generating the intra-prediction block. The final prediction block is generated by an average or weighted average of the inter-prediction block and the intra-prediction block. An equation for calculating the final prediction block in the combined inter-intra prediction is given as follows.

$$P_{final} = ((4-wt)*P_{inter} + wt*P_{intra} + 2) >> 2 \quad \text{[Equation 1]}$$

Here, $P_{inter}$ denotes the inter-prediction block, and $P_{intra}$ denotes the intra-prediction block. wt denotes a weight. +2 is an offset for the rounding-off operation.

The weight may be determined based on whether inter-prediction or intra-prediction is used to predict pre-encoded/decoded neighboring blocks adjacent to the target block. For example, when both the left block and the above block of the target block are intra-predicted, a larger weight is given to the intra-prediction block ($P_{intra}$). For example, wt is set to 3. When only one of the left block and the above block is intra-predicted, the same weight is given to the inter-prediction block ($P_{inter}$) and the intra-prediction block ($P_{intra}$). For example, wt is set to 2. When neither the left block nor the above block is intra-predicted, a larger weight is given to the inter-prediction block ($P_{inter}$). For example, wt is set to 1.

When the target block is predicted through combined inter-intra prediction, the inter-predictor 544 of the video decoding apparatus extracts information about the motion vector of the target block from a bitstream to determine the motion vector of the target block. Then, the target block is predicted in the same manner as in the video encoding apparatus.

The combined inter/intra-prediction is a technique of complementing an inter-prediction signal with an intra-prediction signal and thus may be efficient when the inter-prediction is more or less incorrect, for example, when the motion vector of the target block is determined by the merge mode. Therefore, the combined inter/intra-prediction may be applied only when the motion vector of the target block is determined by the merge mode.

II. Bi-Directional Optical Flow

Bi-directional optical flow is a technique for additionally compensating for motions of samples predicted using bi-directional motion prediction, on the assumption that samples or objects constituting a video moves at a constant speed and that there is little change in sample values.

Figure 6:
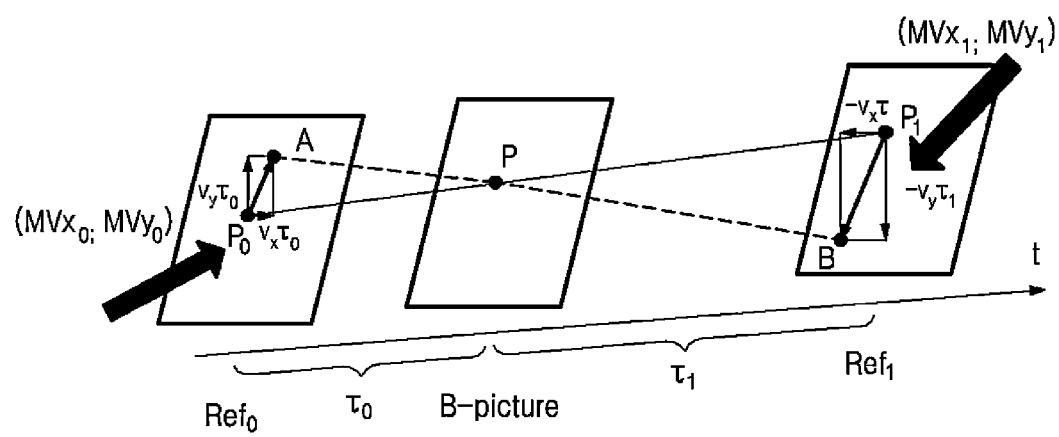
FIG. 6 is a diagram illustrating the concept of bi-prediction optical flow provided by the present disclosure.

FIG. 6 is a diagram illustrating the basic concept of BIO.

Suppose that bi-directional motion vectors MV0 and MV1 pointing to corresponding regions (i.e., reference blocks) most similar to the to-be-encoded target block in the current picture have been determined in the reference pictures Ref0 and by (normal) bi-directional motion prediction for the target block. The two motion vectors have values representing the motion of the entire target block. In the example of FIG. 6, $P_0$ is a sample in the reference picture $Ref_0$ indicated by the motion vector $MV_0$ and corresponding to sample P in the target block, and $P_1$ is a sample in the reference picture $Ref_1$ indicated by the motion vector $MV_1$ and corresponding to sample P in the target block. Further, suppose that motion for sample P in FIG. 6 is slightly different from the overall motion of the target block. For example, when an object located at sample A in $Ref_0$ of FIG. 6 moves to sample B in $Ref_1$ via sample P in the target block of the current picture, sample A and sample B may have values quite similar to each other. Also, in this case, a point in $Ref_0$ most similar to sample P in the target block is not $P_0$ indicated by the bi-directional motion vector $MV_0$, but sample A, which has been shifted from $P_0$ by a predetermined displacement vector $(v_x\tau_0, v_y\tau_1)$. A point in $Ref_1$ most similar to sample P in the target block is not $P_1$ indicated by the bi-directional motion vector $MV_1$, but sample B, which has been shifted from $P_1$ by a predetermined displacement vector $(-v_x\tau_0, -v_y\tau_1)$. Here, $\tau_0$ and $\tau_1$ denote time-axis distances of $Ref_0$ and $Ref_1$ with respect to the current picture, respectively, and are calculated based on picture order count (POC). Hereinafter, $(v_x, v_y)$ is referred to as an "optical flow" or "motion offset."

In predicting the value of sample P of the current block in the current picture, two reference samples A and B enable more accurate prediction than reference samples $P_0$ and $P_1$ indicated by the bi-directional motion vectors $MV_0$ and $MV_1$.

Here, $I^{(0)}(i,j)$ denotes a value of a sample in the reference picture $Ref_0$ indicated by the motion vector $MV_0$ as corresponding to the sample (i,j) in the target block and $I^{(1)}(i,j)$ denotes a value of a sample in the reference picture $Ref_1$ indicated by the motion vector $MV_1$ as corresponding to the sample (i,j) in the target block.

The value of sample A in the reference picture $Ref_0$ indicated by a BIO motion vector $(v_x, v_y)$ as corresponding to the sample in the target block may be defined as $I^{(0)}(i+v_x\tau_0, j+v_y\tau_0)$, and the value of sample B in the reference picture $Ref_1$ may be defined as $I^{(1)}(i-v_x\tau_1, j-v_y\tau_1)$. Here, when linear approximation is performed using only the first-order term of the Taylor series, A and B may be expressed as Equation 2.

$$A = \quad \text{[Equation 2]}$$
$$I^{(0)}(i+v_x\tau_0, j+v_y\tau_0) \approx I^{(0)}(i,j) + v_x\tau_0 I_x^{(0)}(i,j) + v_y\tau_0 I_y^{(0)}(i,j)$$
$$B = I^{(1)}(i-v_x\tau_1, j-v_y\tau_1) \approx$$
$$I^{(1)}(i,j) - v_x\tau_1 I_x^{(1)}(i,j) - v_y\tau_1 I_y^{(1)}(i,j)$$

Here, $I_x^{(k)}$ and $I_y^{(k)}$ (k=0, 1) are gradient values in the horizontal and vertical directions at position (i, j) of $Ref_0$ and $Ref_1$. In Equation 2, $\tau_0$ and $\tau_1$ denote time-axis distances of $Ref_0$ and $Ref_1$ with respect to the current picture, respectively, and are calculated based on POC: $\tau_0$=POC (current)–POC ($Ref_0$), and $\tau_1$=POC ($Ref_1$)–POC (current).

The bi-directional optical flow $(v_x, v_y)$ of each sample in a block is determined as a solution that minimizes $\Delta$, which is defined as a difference between sample A and sample B. Further, $\Delta$ may be defined by Equation 3 using the linear approximation of A and B derived from Equation 2.

$$\Delta = \quad \text{[Equation 3]}$$
$$A - B = \left(I^{(0)} - I^{(1)}\right) + v_x\left(\tau_0 I_x^{(0)} + \tau_1 I_x^{(1)}\right) + v_y\left(\tau_0 I_y^{(0)} + \tau_1 I_y^{(1)}\right)$$

For simplicity, the sample position (i, j) is omitted from each term of Equation 3.

To implement more robust optical flow estimation, it is assumed that the motion is locally consistent with neighboring samples. For the BIO motion vector for a sample (i, j) that is currently to be predicted, the differences $\Delta$ in Equation 3 for all samples (i', j') present in a mask $\Omega$ f a certain size centered on the sample (i, j) are considered. In other words, the optical flow for the current sample (i, j) may be determined as a vector that minimizes the objective function $\Phi(v_x, v_y)$, which is the sum of squares of the differences $\Delta[i', j']$ obtained for the respective samples in the mask $\Omega$, as shown in Equation 4.

$$\Phi(v_x, v_y) = \sum_{[i',j'] \in \Omega} \Delta^2[i', j'] \qquad \text{[Equation 4]}$$

The bi-directional optical flow of the present disclosure may be applied in the case where one of two reference pictures used for bi-directional prediction precedes the current picture in display order, the other one follows the current picture, and the distances from the two reference pictures to the current picture are equal to each other, i.e., the differences in picture order count (POC) between each reference picture and the current picture are equal to each other. Therefore, $\tau_0$ and $\tau_1$ may be ignored.

In addition, the bi-directional optical flow of the present disclosure may be applied only to luma components.

The bi-directional optical flow of the present disclosure may be performed on a subblock basis, not pixel basis, for the target block to which bi-directional prediction is applied. In the following description, the subblock, which can have various sizes of 2×2, 4×4, and 8×8, is assumed to have a size of 4×4 for simplicity.

Before performing the optical flow, the inter-predictor 124 of the video encoding apparatus generates two reference blocks for the target block using the fore-mentioned bi-directional prediction. The first reference block of the two reference blocks represents a block composed of predicted samples generated from the reference picture $\text{Ref}_0$ using the first motion vector $\text{MV}_0$ of the target block, and the second reference block represents a block composed of predicted samples generated from the reference picture $\text{Ref}_1$ using the motion vector $\text{MV}_1$.

The inter-predictor 124 calculates ($v_x$, $v_y$) referred to as an optical flow for each of 4×4 subblocks constituting the target block, using horizontal and vertical gradient values of predicted samples in the first reference block and the second reference block. The optical flow ($v_x$, $v_y$) is determined such that the difference between the predicted samples from the reference picture $\text{Ref}_0$ and the predicted samples from the reference picture $\text{Ref}_1$ is minimized. The inter-predictor 124 derives a sample offset for modifying bi-directional predicted samples for the 4×4 subblock, by using ($v_x$, $v_y$) calculated for the 4×4 subblock and gradients of the predicted samples in the 4×4 subblock.

Specifically, the inter-predictor 124 calculates the horizontal and vertical gradients of sample values at position (i, j) using Equation 5.

$$\frac{\partial I^{(k)}}{\partial x}(i, j) = \left(I^{(k)}(i+1, j) - I^{(k)}(i-1, j)\right) \gg \text{shift1} \qquad \text{[Equation 5]}$$

$$\frac{\partial I^{(k)}}{\partial y}(i, j) = \left(I^{(k)}(i, j+1) - I^{(k)}(i, j-1)\right) \gg \text{shift1}$$

Here, k is 0 or 1, and $I^{(0)}(i,j)$ and $I^{(1)}(i,j)$ denote sample values at position (i,j) in the first reference block and the second reference block, respectively. Also, shift1 is a value derived from bit-depth for a luma component, for example shift1=max(6, bitDepth-6).

Figure 7:
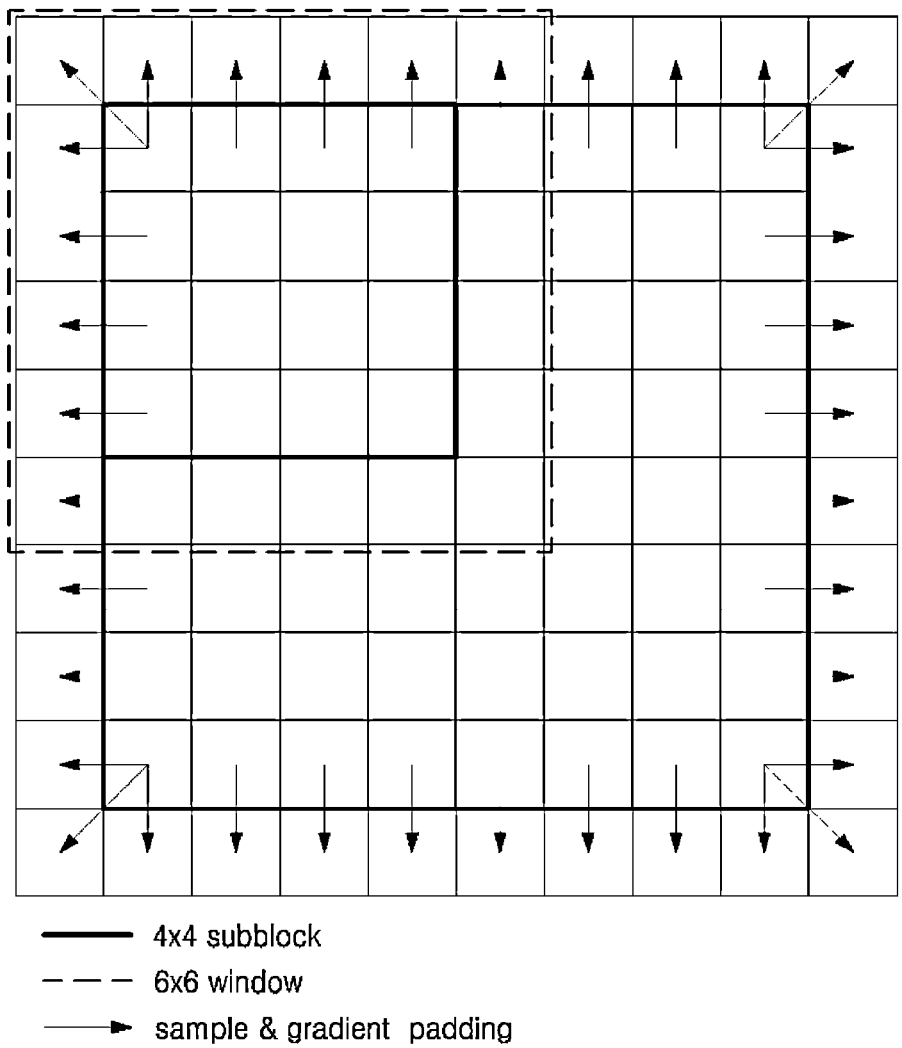
FIG. 7 is a diagram illustrating a method of deriving a gradient for a block boundary sample in the bi-directional optical flow.

In order to derive a gradient of a sample located at the boundary of each reference block, samples outside the boundary of the first reference block and the second reference block are needed. Accordingly, as shown in FIG. 7, each reference block is extended by one column to the left and right and by one row to the upper side and lower side. In order to reduce the amount of computation, each sample in the extended portion may be padded with a sample or integer sample at the nearest position in the reference block. Also, gradients at a sample position outside the boundary of each reference block may be padded with gradients corresponding to samples at the nearest position.

The inter-predictor 124 calculates S1, S2, S3, S5, and S6 corresponding to auto-correlation and cross-correlation of gradients using the horizontal and vertical gradients in a 6×6 window covering a 4×4 subblock as shown in FIG. 7.

$$S_1 = \sum_{(i,j) \in \Omega} \psi_x(i, j) \cdot \psi_x(i, j), \qquad \text{[Equation 6]}$$

$$S_2 = \sum_{(i,j) \in \Omega} \psi_x(i, j) \cdot \psi_y(i, j),$$

$$S_3 = \sum_{(i,j) \in \Omega} \theta(i, j) \cdot \psi_x(i, j),$$

$$S_5 = \sum_{(i,j) \in \Omega} \psi_y(i, j) \cdot \psi_y(i, j),$$

$$S_6 = \sum_{(i,j) \in \Omega} \theta(i, j) \cdot \psi_y(i, j),$$

Here, $\Omega$ denotes a window covering the subblock. In addition, as shown in Equation 7 below, $\Psi_x(i,j)$ denotes the sum of the horizontal gradient values at position (i,j) in the first reference block and the second reference block, $\Psi_y(i,j)$ denotes the sum of the vertical gradient values at position (i,j) position in the first reference block and the second reference block, and $\theta(i,j)$ denotes a difference between the sample value at position (i,j) in the second reference block and the sample value at position (i,j) in the first reference block.

$$\psi_x(i, j) = \left(\frac{\partial I^{(1)}}{\partial x}(i, j) + \frac{\partial I^{(0)}}{\partial x}(i, j)\right) \gg n_a \qquad \text{[Equation 7]}$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) \gg n_b\right) - \left(I^{(0)}(i, j) \gg n_b\right)$$

Here, $n_a$ and $n_b$ are values derived from the bit-depth, and have values of min (1, bitDepth-11) and min (4, bitDepth-8).

The inter-predictor 124 calculates the optical flows ($v_x$, $v_y$) for the 4×4 subblock using Equation 8 based on S1, S2, S3, S5, and S6.

[Equation 8]

$$v_x = S_1 > 0 ?\ \text{clip3}\left(-th'_{BIO},\ th'_{BIO},\ -((S_3 \cdot 2^{n_b - n_a}) \gg \lfloor \log_2 S_1 \rfloor)\right): 0$$

$$v_y = S_5 > 0 ?\ \text{clip3}$$

$$\left(-th'_{BIO},\ th'_{BIO},\ -((S_6 \cdot 2^{n_b - n_a} - ((v_x S_{2,m}) \ll n_{S_2} + v_x S_{2,s})/2 \gg \lfloor \log_2 S_5 \rfloor)\right): 0$$

Here, $S_{2,m} = S_2 \gg n_{S_2}$, $S_{2,s} = S_2 \& (2^{n_{S_2}} - 1)$ and $th'_{BIO} = 2^{max(5, BD-7)}$. $\lfloor\ \rfloor$ is a floor function, and $n_{S_2} = 12$.

The sample offset for modifying the predicted sample at each sample position (x, y) in the 4×4 subblock in the target block may be calculated using the optical flow calculated for the 4×4 subblock and gradient values at the sample position (x, y), as shown in Equation 9. In Equation 9, rnd ( ) represents a round-off operation.

[Equation 9]
$$b(x, y) = rnd\left(\left(v_x\left(\frac{\partial I^{(1)}(x, y)}{\partial x} - \frac{\partial I^{(0)}(x, y)}{\partial x}\right)\right)/2\right) + rnd\left(\left(v_y\left(\frac{\partial I^{(1)}(x, y)}{\partial y} - \frac{\partial I^{(0)}(x, y)}{\partial y}\right)\right)/2\right)$$

The inter-predictor 124 generates a final predicted sample pred (x,y) using the sample offset b(x,y) at position (x, y), and predicted samples $I^{(0)}(x,y)$ and $I^{(1)}(x,y)$ in the first reference block and the second reference block, as in Equation 10.

[Equation 10]
$$pred(x, y) = \left(I^{(0)}(x, y) + I^{(1)}(x, y) + b(x, y) + O_{offset}\right) \gg shift$$

Here, shift is Max (3, 15-BitDepth), and $O_{offset}$ is a value for a rounding-off operation and is half the shift.

As described above, the bi-directional optical flow technique uses values of samples predicted using motion information (two motion vectors and two reference pictures) used for bi-directional prediction. Therefore, the inter-predictor 544 of the video decoding apparatus may also perform the bi-directional optical flow in the same manner as the video encoding apparatus, using the motion information (motion vectors, reference pictures) for bi-directional prediction received from the video encoding apparatus. It is not required that the video encoding apparatus signals additional information for the bi-directional optical flow process to the video decoding apparatus.

The bi-directional optical flow technique described above may be applied to the chroma component. In this case, in order to reduce the computational complexity, the optical flow calculated for the luma component may be used as the optical flow for the chroma component without recalculating the optical flow ($v_x$, $v_y$) for the chroma component. Therefore, when the bi-directional optical flow is applied for the chroma component, only the horizontal and vertical gradients of the chroma component of each sample need to be calculated.

The bidirectional optical flow described above requires a large amount of computation by itself. In addition, when used with other coding tools, the bidirectional optical flow may further increase computational complexity and delay the encoding/decoding process. In addition, the bidirectional optical flow combined with some coding tools may not contribute to improvement of coding efficiency. In consideration of these points, the execution of the bidirectional optical flow may be restricted under certain conditions. The video encoding apparatus and the video decoding apparatus skip the bidirectional optical flow by checking whether a predefined condition is satisfied prior to the execution of the bidirectional optical flow. Conditions for constraining the execution of the bidirectional optical flow are described below. When one or more of the conditions are satisfied, the bidirectional optical flow is not executed and is skipped.

In some embodiments, the bidirectional optical flow is not used with affine motion prediction to be described below. Since both the bidirectional optical flow and the affine motion prediction require a lot of calculation, the combination of the two coding tools not only increases the complexity of calculation but also delays the encoding/decoding process. Therefore, when affine motion prediction is used for a target block, the bidirectional optical flow for the target block is not executed.

In some other embodiments, the bidirectional optical flow may be constrained not to be used with inter-intra merge prediction techniques. When the inter-intra merge prediction technique is applied to the target block, the bidirectional optical flow for the target block is not applied. In the intra-prediction, pre-reconstructed samples around the target block are used, and thus prediction for the target block is possible after decoding (sample reconstruction) of the neighboring blocks is completed. Therefore, when both the combined inter-intra prediction and the bi-directional optical flow are applied, the bi-directional optical flow process should be stopped until intra-prediction of the target block can be performed after decoding for all the neighboring blocks of the target block is completed. This may lead to serious delays in the decoding process. Accordingly, the bi-directional optical flow may not be applied to a block to which combined inter-intra prediction is applied.

In addition, the bi-directional optical flow may be restricted from being used together with local illumination compensation, which is described below. For example, when local illumination compensation is applied, the bi-directional optical flow is not applied.

In some other embodiments, when the current picture including the target block or the reference picture referenced by the target block is a picture split into subpictures, the bidirectional optical flow is not applied.

In some other embodiments, when weighted bidirectional prediction is performed on the target block and different weights are applied to two reference blocks (the first reference block and the second reference block), the bidirectional optical flow is not executed. In other words, when weights to be applied to two reference blocks (luma components in the two reference blocks) to predict the luma component are different from each other, the bidirectional optical flow for the target block is not executed. Also, when weights to be applied to two reference blocks (chroma components in the two reference blocks) to predict the chroma component are different from each other, the bidirectional optical flow for the target block is not executed. As described above, the bidirectional optical flow is based on the assumption that there is little change in sample values between pictures. In contrast, the weighted bidirectional prediction assumes a change in a sample value between pictures. Accordingly, when the weighted bidirectional prediction in which different weights are applied is executed, the bidirectional optical flow for the target block is skipped.

Alternatively, in the case of bidirectional prediction in which different weights are applied, the bidirectional optical flow may be performed by applying the different weights. When weights applied to the first reference block ($I^{(0)}(x,y)$) and the second reference block ($I^{(1)}(x,y)$) are $w_0$ and $w_1$, respectively, $I^{(0)}(x,y)$ and $I^{(1)}(x,y)$ in Equations 5 to Equation 10 are replaced by $w_0 I^{(0)}(x,y)$ and $w_1 I^{(0)}(x,y)$. In other words, instead of sample values in the two reference blocks, sample values multiplied by the weights corresponding to the two reference blocks respectively may be used to calculate an optical flow ($v_x$, $v_y$), a sample offset b(x,y), and a final prediction sample pred(x,y).

III. Affine Motion Prediction

The inter-prediction described above is motion prediction reflecting a translation motion model. In other words, it is a technique for predicting motion in the horizontal direction (x-axis direction) and the vertical direction (y-axis direction). However, in practice, there may be various types of motions such as rotation, zoom-in, or zoom-out in addition to the translational motion. One aspect of the present disclosure provides affine motion prediction capable of covering such various types of motions.

Figure 8:
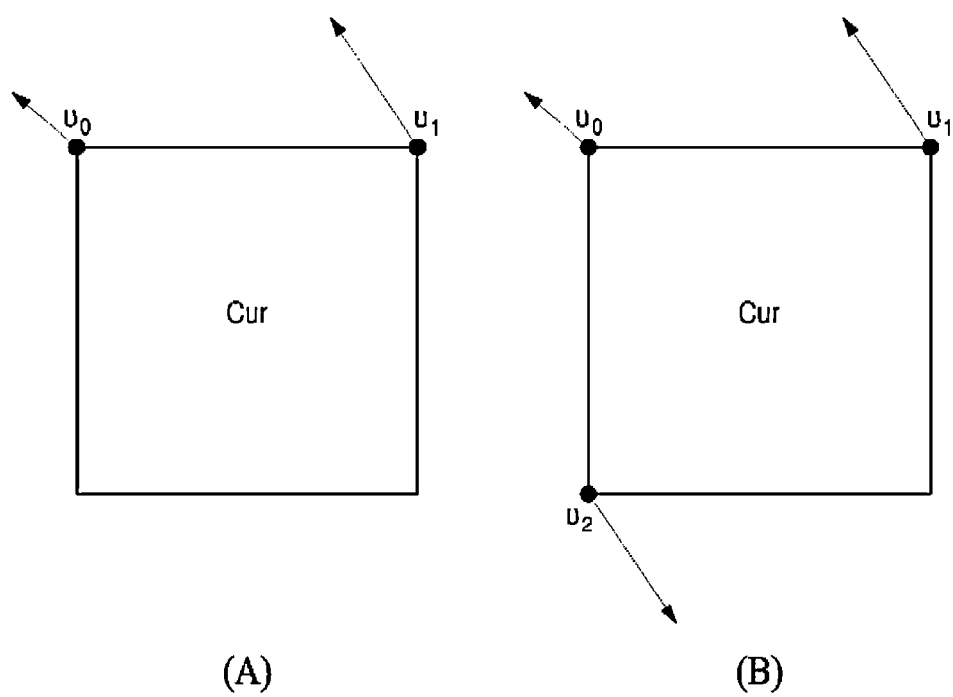
FIGS. 8 and 9 are diagrams illustrating affine motion prediction provided by the present disclosure.

FIG. 8 is a diagram illustrating affine motion prediction.

There may be two types of models for affine motion prediction. One is a model using the motion vectors of two control points of the top-left corner and top-right corner of a target block to be currently encoded, i.e., four parameters, as shown in FIG. 8(A). The other model is a model using the motion vectors of three control points of the top-left corner, top-right corner, and bottom-left corner of the target block, i.e., six parameters, as shown in FIG. 8(B).

The four-parameter affine model is expressed by Equation 11. The motion at the sample position (x, y) in the target block may be calculated by Equation 11. Here, the position of the above left sample of the target block is assumed to be (0, 0).

$$\begin{cases} mv_x = \frac{mv_{1x} - mv_{0x}}{W}x + \frac{mv_{0y} - mv_{1y}}{W}y + mv_{0x} \\ mv_y = \frac{mv_{1y} - mv_{0y}}{W}x + \frac{mv_{1x} - mv_{0x}}{W}y + mv_{0y} \end{cases} \quad \text{[Equation 11]}$$

The six-parameter affine model is expressed by Equation 12. The motion at the sample position (x, y) in the target block may be calculated by Equation 12.

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad \text{[Equation 12]}$$

Here, $(mv_{0x}, mv_{0y})$ is the motion vector of the top-left corner control point, $(mv_{1x}, mv_{1y})$ is the motion vector of the top-right corner control point, and $(mv_{2x}, mv_{2y})$ is the motion vector of the bottom-left corner control point. Also, W is a constant determined from the horizontal length of the target block, and His a constant determined from the vertical length of the target block.

The affine motion prediction may be performed for each sample in the target block using a motion vector calculated through Equation 11 or Equation 12.

Figure 9:
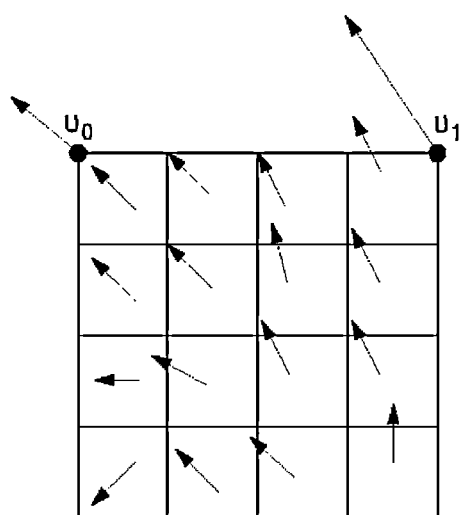

Alternatively, in order to reduce the computational complexity, the prediction may be performed for each subblock split from the target block as shown in FIG. 9. For example, the size of the subblock may be 4×4, 2×2, or 8×8. In an embodiment below, the affine motion prediction for the target block is performed on a 4×4 subblock basis. This example is for convenience of explanation only and the present disclosure is not limited thereto.

In the subblock-based affine motion prediction, the motion vector (affine motion vector) of each subblock is calculated by substituting the center position of each subblock in (x, y) of Equation 11 or 12. Here, the center position may be an actual center point of the subblock or the bottom-right sample position of the center point. For example, in the case of a 4×4 subblock in which the coordinates of the bottom-left sample are (0, 0), the center position of the subblock may be (1.5, 1.5) or (2, 2). The predicted block for each subblock is generated using the affine motion vector $(mv_x, mv_y)$ of the subblock.

The motion vectors $(mv_x, mv_x)$ may be set to have ¹⁄₁₆ sample precision. In this case, the motion vector $(mv_x, mv_y)$ calculated through Equation 11 or 12 may be rounded in ¹⁄₁₆ sample units. Adaptive motion vector resolution may be applied to the affine motion prediction as in the normal inter-prediction. In this case, information about the motion vector resolution of the target block, i.e., the precision of the motion vector, is signaled for each target block.

The affine motion prediction may be performed for not only the luma component but also the chroma component. In the case of a 4:2:0 video format, when affine motion prediction for the luma component is performed on a 4×4 subblock basis, affine motion prediction for the chroma component may be performed on a 2×2 subblock basis. The motion vector $(mv_x, mv_y)$ of each subblock of the chroma component may be derived from the motion vector of the corresponding luma component. Alternatively, the size of the subblock for affine motion prediction of the chroma component may be the same as that for the luma component. When affine motion prediction for the luma component is performed on a 4×4 subblock basis, affine motion prediction for the chroma component is also performed on the 4×4 subblock basis. In this case, since the 4×4 subblock for the chroma component corresponds to four 4×4 subblocks for the luma component, the motion vector $(mv_x, mv_y)$ for the subblock of the chroma component may be calculated by calculating the average of the motion vectors of the four corresponding subblocks of the luma component.

The video encoding apparatus performs intra-prediction, inter-prediction (translational motion prediction), affine motion prediction, and the like and calculates a rate-distortion (RD) cost to select an optimal prediction method. In order to perform affine motion prediction, the inter-predictor 124 of the video encoding apparatus determines which of the two types of models to use and determines two or three control points according to the determined type. The inter-predictor 124 calculates the motion vector $(mv_x, mv_y)$ for each of 4×4 subblocks in the target block using the motion vectors of the control points. Then, the inter-predictor 124 performs motion compensation in a reference picture on a subblock-by-subblock basis using the motion vector $(mv_x, mv_x)$ of each subblock to generate a predicted block for each subblock in the target block.

The entropy encoder 155 of the video encoding apparatus encodes affine related syntax elements including a flag indicating whether affine motion prediction is applied to the target block, type information indicating a type of the affine model, and motion information indicating a motion vector of each control point. The entropy encoder 155 of the video encoding apparatus also transmits the same to the video decoding apparatus. The type information and the motion information about the control points may be signaled when affine motion prediction is performed, and as many motion vectors of the control points as a number determined according to the type information may be signaled. In addition, when adaptive motion vector resolution is applied, motion vector resolution information about the affine motion vector of the target block is signaled.

The video decoding apparatus determines the type of the affine model and the control point motion vectors using the signaled syntax elements and calculates the motion vector $(mv_x, mv_y)$ for each 4×4 subblock in the target block using Equation 11 or 12. In the case where the motion vector resolution information about the affine motion vector of the target block is signaled, the motion vector $(mv_x, mv_y)$ is corrected to a precision identified by the motion vector resolution information through operations such as rounding-off.

The video decoding apparatus generates a predicted block for each subblock by performing motion compensation within a reference picture using the motion vector ($mv_x$, $mv_y$) for each subblock.

In order to reduce the amount in bits required to encode the motion vectors of control points, a method as used in the above-described normal inter-prediction (translational motion prediction) may be applied.

As an example, in the merge mode, the inter-predictor 124 of the video encoding apparatus derives a motion vector of each control point from neighboring blocks of the target block. For example, the inter-predictor 124 generates a merge candidate list by deriving a predefined number of merge candidates from neighboring samples L, BL, A, AR, and AL of the target block illustrated in FIG. 4. Each of the merge candidates included in the list corresponds to a pair of motion vectors of two or three control points.

First, the inter-predictor 124 derives a merge candidate from the control point motion vectors of the neighboring blocks predicted in the affine mode among the neighboring blocks. In some embodiments, the number of merge candidates derived from neighboring blocks predicted in the affine mode may be limited. For example, the inter-predictor 124 may derive two merge candidates from the neighboring blocks predicted in the affine mode: one of L and BL and one of A, AR, and AL. The priority may be assigned in order of L and BL and in order of A, AR and AL.

When the total number of merge candidates is greater than or equal to 3, the inter-predictor 124 may derive a necessary number of merge candidates from the translational motion vectors of the neighboring blocks.

Figure 10:
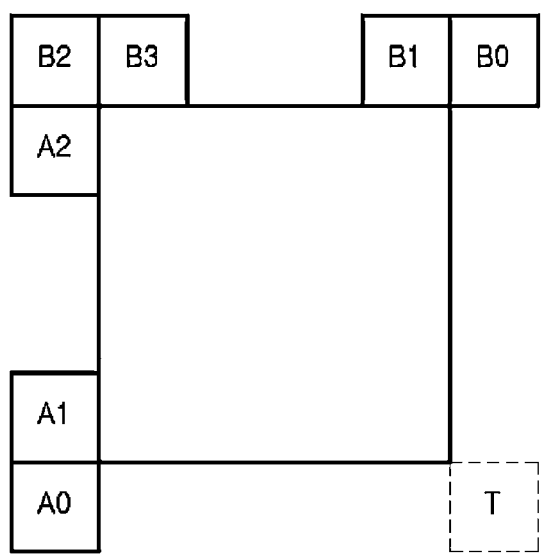
FIG. 10 is a diagram illustrating a method of deriving merge candidates for affine motion prediction from translation motion vectors of neighboring blocks.

FIG. 10 is a diagram illustrating a method of deriving merge candidates for affine motion prediction from translation motion vectors of neighboring blocks.

The inter-predictor 124 derives control point motion vectors CPMV1, CPMV2, CPMV3 from a neighboring block group {B2, B3, A2}, a neighboring block group {B1, B0}, and a neighboring block group {A1, A0}, respectively. As an example, the priorities in each neighboring block group may be assigned in order of B2, B3, A2, order of B1 and B0, and order of A1 and A0. In addition, another control point motion vector CPMV4 is derived from a collocated block T in the reference picture. The inter-predictor 124 generates as many merge candidates as necessary through combinations of two or three control point motion vectors among the four control point motion vectors. The priorities of the combinations are assigned as shown below. The elements in each group are listed in order of the top-left corner, top-right corner, and bottom-left corner control point motion vectors.

{CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}.

The inter-predictor 124 selects a merge candidate in the merge candidate list and performs affine motion prediction on the target block. When the selected candidate consists of two control point motion vectors, affine motion prediction is performed using a four-parameter model. On the other hand, when the selected candidate consists of three control point motion vectors, affine motion prediction is performed using a six-parameter model. The entropy encoder 155 of the video encoding apparatus encodes index information indicating the selected merge candidate among the merge candidates in the merge candidate list and signals the same to the video decoding apparatus.

The entropy decoder 510 of the video decoding apparatus decodes the index information signaled from the video encoding apparatus. The inter-predictor 544 of the video decoding apparatus constructs a merge candidate list in the same manner as the video encoding apparatus and performs affine motion prediction using control point motion vectors corresponding to the merge candidate indicated by the index information.

As another example, in the AMVP mode, the inter-predictor 124 of the video encoding apparatus determines the type of the affine model and control point motion vectors for the target block. Then, the inter-predictor 124 calculates motion vector differences, which are differences between the actual control point motion vectors of the target block and the predicted motion vectors of the respective control points, and transmits the motion vector differences, which respectively correspond to the control points. To this end, the inter-predictor 124 of the video encoding apparatus configures a list of a predefined number of affine AMVPs. When the target block is of a 4-parameter type, the candidates included in the list are each comprising a pair of two control point motion vectors. On the other hand, when the target block is of a 6-parameter type, the candidates included in the list are each comprising a pair of three control point motion vectors. The affine AMVP list may be derived using control point motion vectors or translational motion vectors of neighboring blocks in a manner similar to the method of constructing a merge candidate list described above.

However, in order to derive candidates to be included in the affine AMVP list, there may be a restriction of considering only neighboring blocks that refer to the same reference picture as the target block among the neighboring blocks of FIG. 4.

In addition, in the AMVP mode, the affine model type of the target block should be considered. When the affine model type of the target block is a 4-parameter type, the video encoding apparatus derives two control point motion vectors (top-left corner and top-right corner control point motion vectors of the target block) using the affine model of a neighboring block. When the affine model type of the target block is a 6-parameter type, the apparatus derives three control point motion vectors (top-left corner, top-right corner, and bottom-left control point motion vectors of the target block) using the affine model of a neighboring block.

When the neighboring block is of the 4-parameter type, two or three control point motion vectors are predicted according to the affine model type of the target block using two control point motion vectors of the neighboring block. For example, an affine model of a neighboring block expressed by Equation 11 may be used. In Equation 11, ($mv_{0x}$, $mv_{0y}$) and ($mv_{1x}$, $mv_{1y}$) are replaced by the top-left corner and top-right corner control point motion vectors of the neighboring block, respectively. Also, W is replaced by the horizontal length of the neighboring block. The predicted motion vector for each control point of the target block may be derived by inputting, into (x, y), the difference between the position of the corresponding control point of the target block and the position of the top-left corner of the neighboring block.

When the neighboring block is of the 6-parameter type, two or three control point motion vectors are predicted according to the affine model type of the target block using three control point motion vectors of the neighboring block. For example, an affine model of a neighboring block expressed by Equation 12 may be used. In Equation 12, ($mv_{0x}$, $mv_{0y}$), ($mv_{1x}$, $mv_{1y}$), and ($mv_{2x}$, $mv_{2y}$) are replaced by control point motion vectors of the top-left corner, top-right corner, and bottom-left corner of the neighboring block, respectively. W and H are replaced by the horizontal length and vertical length of the neighboring block, respectively. The predicted motion vector for each control point of the target block may be derived by inputting, into (x, y), the difference between the position of the corresponding control point of the target block and the position of the top-left corner of the neighboring block.

The inter-predictor 124 of the video encoding apparatus selects one candidate in the affine AMVP list and generates motion vector differences between the motion vector of each actual control point and the predicted motion vector of the corresponding control point of the selected candidate. The entropy encoder 155 of the video encoding apparatus encodes type information indicating the affine model type of the target block, index information indicating a selected candidate among the candidates in the affine AMVP list, and a motion vector difference corresponding to each control point and transmits the same to the video decoding apparatus.

The inter-predictor 544 of the video decoding apparatus determines the affine model type using the information signaled from the video encoding apparatus and generates a motion vector difference of each control point. Then, the inter-predictor generates an affine AMVP list in the same manner as the video encoding apparatus and selects a candidate indicated by the index information signaled in the affine AMVP list. The inter-predictor 544 of the video decoding apparatus calculates a motion vector of each control point by adding the predicted motion vector of each control point of the selected candidate and a corresponding motion vector difference.

IV. Sample-by-Sample Adjustment for Affine Motion Prediction Samples

Subblock-by-subblock affine motion prediction for a target block has been described above. Another aspect of the present disclosure relates to adjusting, on a sample-by-sample basis, sample values of predicted samples generated by subblock-by-subblock affine motion prediction. The motion according to the position of each sample is additionally compensated in each subblock that forms the basis of affine motion prediction.

When the sample values in any one subblock generated as a result of subblock-by-subblock affine motion prediction for a target block are I(x, y), the video encoding apparatus calculates the horizontal and vertical gradients $g_x(i,j)$ and $g_x(i,j)$ at each sample position. Equation 13 may be used to calculate the gradients.

$$g_x(i, j) = I(i+1, j) - I(i-1, j) \quad \text{[Equation 13]}$$
$$g_y(i, j) = I(i, j+1) - I(i, j-1)$$

The sample offset ΔI(i,j) for adjusting the prediction sample is calculated by the following equation.

$$\Delta I(i, j) = g_x(i, j) * \Delta mv_x(i, j) + g_y(i, j) * \Delta mv_y(i, j) \quad \text{[Equation 14]}$$

Here, Δmv(i,j) denotes a motion offset, i.e., a difference between the affine motion vector in the sample (i,j) and the affine motion vector at the center position of the subblock and may be calculated by applying Equation 11 or Equation 12 depending on the affine model type of the target block. In other words, Δmv(i,j) may be calculated from Equation 11 or 12 by subtracting the motion vector given when the subblock center position is input to (x,y) from the motion vector given when (i,j) is input to (x,y). In other words, Δmv(i,j) may be calculated from an equation, which is obtained by substituting (x, y) in Equations 11 and 12 with the horizontal and vertical offsets from the subblock center position to the sample position (i,j) and removing the last term "+$mv_{0x}$" and "+$mv_{0y}$." The center position may be the actual center point of the subblock or may be the bottom-right sample position of the center point.

The motion vector of each control point of the target block used for calculation of Δmv(i,j) and the difference between the sample position (i,j) and the center position of the subblock are the same for all subblocks. Accordingly, the values of Δmv(i,j) may be calculated for only one subblock, for example, a first subblock and may be reused for the other subblocks.

The technique of the present disclosure is based on the assumption that the object moves at a constant speed and the change in sample values is smooth. Therefore, sample variations in the horizontal direction and the amount of sample change in the vertical direction are obtained by multiplying the x component ($\Delta mv_x$) and y component ($\Delta mv_y$) of Δmv(i,j) by the horizontal and vertical sample gradient values, respectively. The sample offset ΔI(i,j) is calculated by adding the two sample variations.

The final value of the predicted sample is calculated as follows.

$$I'(i, j) = I(i, j) + \Delta I(i, j) \quad \text{[Equation 15]}$$

When sample-by-sample adjustment for affine motion prediction samples is applied, the inter-predictor 124 of the video encoding apparatus and the inter-predictor 544 of the video decoding apparatus perform the above-described process to modifying the sample values of the predicted samples generated through the affine motion prediction. Gradient values are derived from the predicted samples generated through the affine motion prediction, and Δmv(i,j) is derived from the control point motion vectors of the target block. Therefore, it is not required that the video encoding apparatus signals additional information for the process of the present technique to the video decoding apparatus.

The sample-by-sample adjustment technique for the affine motion prediction samples described above is applied to the luma component. Additionally, the present technique may be applied even to the chroma component. In this case, $\Delta mv_x$ and $\Delta mv_y$ calculated for the luma component may be used as $\Delta mv_x$ and $\Delta mv_y$ for the chroma component without separate calculation. In other words, the video encoding apparatus and the video decoding apparatus calculate gradient values for predicted samples of the chroma component generated through affine motion prediction. Then, predicted samples of the chroma component generated through affine motion prediction may be adjusted by substituting the gradient values of the chroma component and $\Delta mv_x$ and $\Delta mv_y$ calculated for the luma component into Equations 14 and 15.

In the case of bidirectional prediction, Equation 14 and Equation 15 are applied to each of the two reference pictures. The video encoding apparatus and the video decoding apparatus generate two reference blocks by performing sample-by-sample adjustment on an affine prediction sample for each of the reference picture of the reference picture list 0 and the reference picture of the reference picture list 1. The two reference blocks are generated by Equation 14 and Equation 15. The final prediction block for the target block may be generated by averaging between two reference blocks. When a bit depth is 10, a process of generating the final prediction block is expressed as follows.

[Equation 16]

$$I'(i, j) = clip3 \begin{pmatrix} 0, 1023, \\ (I_0(i, j) + clip3(-2^{13}, 2^{13} - 1, ((g_{x0}(i, j) * \Delta mv_{x0}(i, j) + \\ g_{y0}(i, j) * \Delta mv_{y0}(i, j) + 1) \gg 1)) + \\ (I_1(i, j) + clip3(-2^{13}, 2^{13} - 1, ((g_{x1}(i, j) * \Delta mv_{x1}(i, j) + \\ g_{y1}(i, j) * \Delta mv_{y1}(i, j)) + 1) \gg 1)) + \\ 16400 \gg 5 \end{pmatrix}$$

In Equation 16, "$I_0(i,j)$+clip3( )" are prediction samples in a reference block generated by applying the present technique to the reference picture of reference picture list 0, and "$I_1(i,j)$+clip3( )" is prediction samples in the reference block generated by applying the present technique to the reference picture of the reference picture list 1.

In order to prevent delays due to execution of the sample-by-sample adjustment technique for the affine motion prediction samples, it may be determined whether the application of the technique is appropriate before executing the technique. The technique may thereby be skipped without execution.

As an example, the video encoding apparatus may determine whether to apply the present technique on a predefined image region basis and signal a flag indicating whether to apply the technique to the video decoding apparatus. Here, the predefined image region may be a sequence of pictures, a picture, or a slice. When the application of the present technique is determined on a sequence-by-sequence, picture-by-picture, or slice-by-slice basis, the flag may be included in a header (SPS) of a sequence, a header (PPS) of a picture, or a slice header. The video decoding apparatus may extract the flag contained in the bitstream and determine whether the present technique is applied to blocks in the image region corresponding to the extracted flag.

As another example, it may be predetermined whether to apply the present technique to the target block based on control point motion vectors of the target block. When the values of the control point motion vectors of the target block are all the same, this technique is not applied. When the affine type of the target block is a 4-parameter model, this technique is not executed when the control point motion vectors of the top-left corner and top-right corner are the same. In the case of the 6-parameter model, this technique is not executed when the control point motion vectors of the top-left corner, top-right corner, and bottom-left corner are the same.

As another example, it may be determined whether to apply the present technique based on the angle between the control point motion vectors. For example, when the angle between the control point motion vectors is an obtuse angle (i.e., the dot product between the vectors is negative), the present technique may not be applied. Alternatively, when the angle between the control point motion vectors is an acute angle (i.e., the dot product between the vectors is positive), the present technique may be restricted from being applied.

As another example, when the control point motion vectors of the target block refer to reference pictures in different reference picture lists, application of the present technique may be excluded.

As another example, to minimize the delay, the technique may be restricted from being used together with the combined inter-intra prediction technique, as in the case of the bi-directional optical flow. In addition, the application of the present technique may be excluded in the case where the local illumination compensation described below is applied or in the case of bi-directional prediction.

As another example, in unidirectional or bidirectional prediction, if the reference picture referenced by the target block is not a short-term reference picture, the technique is not executed.

As another example, when the current picture including the target block or the reference picture referenced by the target block is a picture split into subpictures, the technique is not applied.

As another example, when bidirectional prediction is performed and different weights are applied to two prediction blocks (the first reference block and the second reference block) generated by affine motion prediction, the present technique is not executed. In other words, when luma weights to be applied to two reference blocks (luma components in the two reference blocks) to predict the luma component are different from each other, this technique is not applied to the target block. Also, when chroma weights to be applied to two reference blocks (chroma components in the two reference blocks) to predict the chroma component are different from each other, this technique is not applied to the target block.

Alternatively, in the case of bidirectional prediction to which different weights are applied, the present technique may be executed by applying the different weights. For example, the video encoding apparatus or the video decoding apparatus generates two reference blocks by performing sample-by-sample adjustment on an affine prediction sample for each of the reference picture of the reference picture list 0 and the reference picture of the reference picture list 1. Thereafter, the final prediction block is generated by applying the corresponding weights to the two reference blocks.

Even after the sample-by-sample adjustment technique for the affine motion prediction samples is executed, the execution of the present technique may be stopped if the values of $\Delta mv_x$ and $\Delta mv_y$ are less than a predetermined threshold.

V. Local Illumination Compensation

The local illumination compensation technique is a coding technique of compensating for variation in illumination between the target block and the predicted block with a linear model. The inter-predictor 124 of the video encoding apparatus determines a reference block in a reference picture using the motion vector (translational motion vector) of the target block and obtains parameters of a linear model for illumination compensation using pre-reconstructed samples around (on the upper and left sides of) the reference block and pre-reconstructed samples around (on the upper and left sides of) the target block.

When the pre-reconstructed samples around the reference block are referred to as x and the corresponding pre-reconstructed samples around the target block are referred to as y, parameters "A" and "b" are derived as in Equation 17 such that the sum of squares of the differences between y and (Ax+b) is minimized.

$$\mathrm{argmin}\left\{\sum(y - Ax - b)^2\right\} \qquad \text{[Equation 17]}$$

Final prediction samples are generated by applying the weight of A and the offset of b to samples in the prediction block (reference block) generated by the motion vector of the target block, as shown in Equation 18. In Equation 18, pred [x] [y] is a prediction sample of the (x, y) position generated by the motion vector of the target block, and $\text{pred}_{LIC}[x][y]$ is a final prediction sample after illumination compensation.

$$\text{pred}_{LIC}[x][y] = A * \text{pred}[x][y] + b \qquad \text{[Equation 18]}$$

Another aspect of the present disclosure relates to a technique for combining the illumination compensation technique with affine motion prediction.

As described above, when subblock-by-subblock affine motion prediction is applied to the target block, a motion vector is generated for each of the subblocks. The illumination compensation parameters may be derived using the corresponding motion vector for each subblock, and then the illumination compensation may be performed in the unit of the subblocks using the corresponding motion vector. This, however, not only increases the complexity of calculation but also raises a serious delay issue. Since the reconstructed samples in each subblock are needed for illumination compensation of the next subblock, the illumination compensation process for the subblock should be suspended until an adjacent subblock is reconstructed (i.e., until both the prediction block and the residual block for the subblock are reconstructed). The present disclosure is directed to addressing such issues.

Figure 11A:
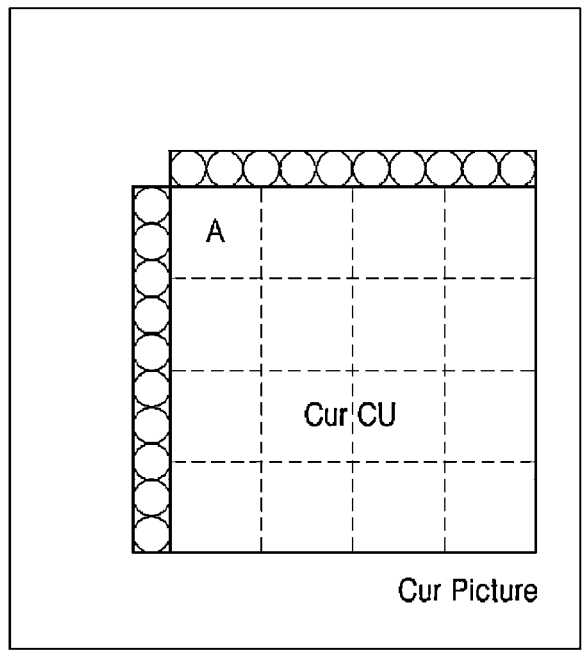
FIGS. 11A-11C are diagrams illustrating a method of deriving an illumination compensation parameter according to an embodiment of illumination compensation provided by the present disclosure.
Figure 11A:
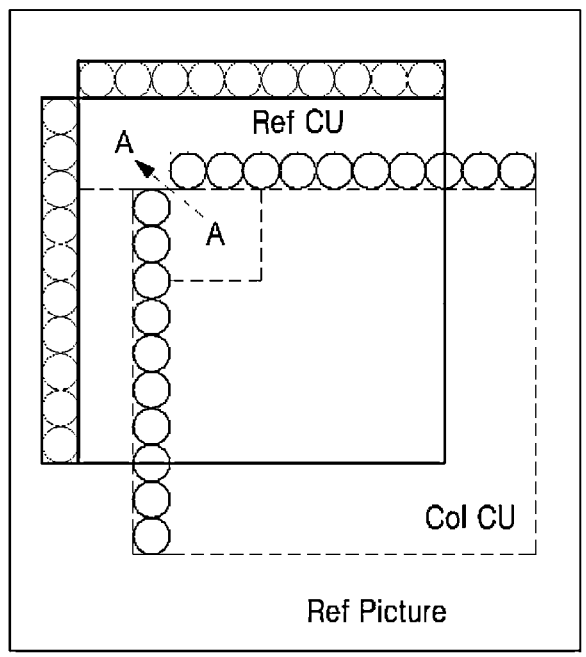
Figure 11B:
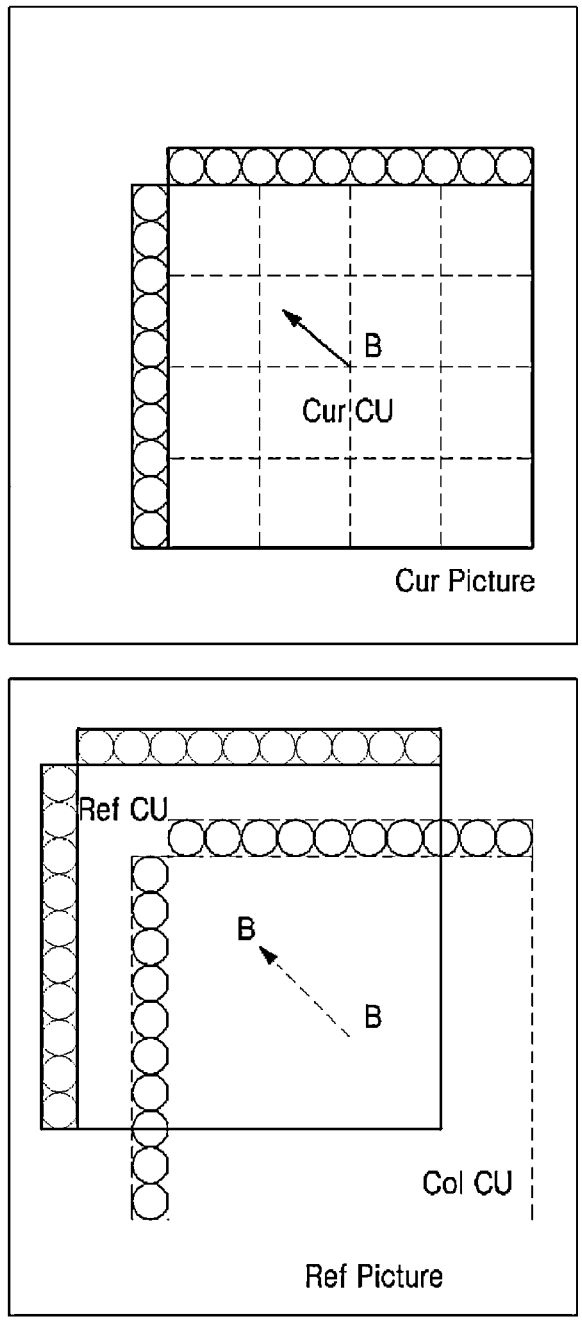
Figure 11C:
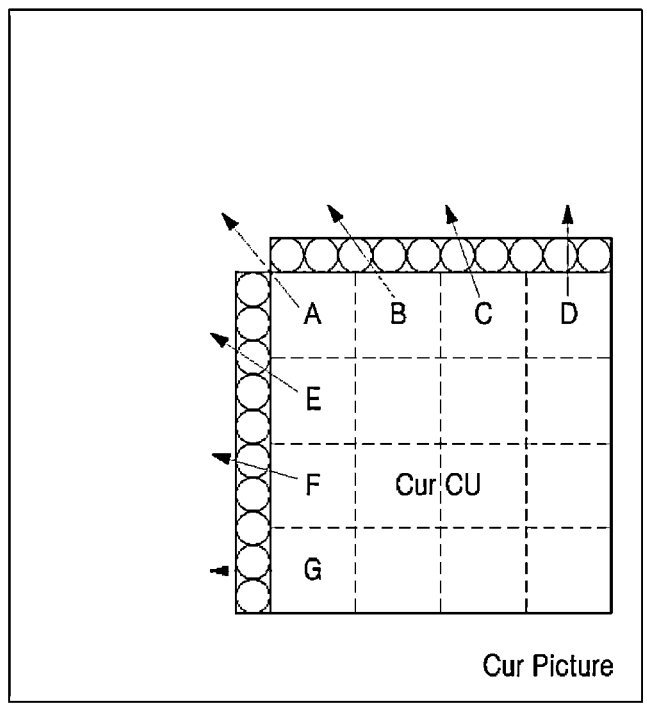
Figure 11C:
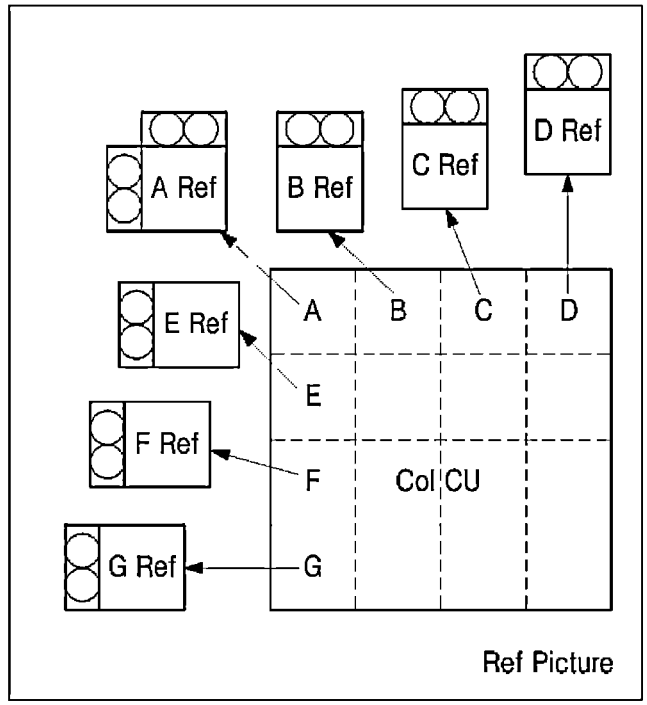

FIGS. 11A-11C shows various examples of determining the position of a reference block to derive an illumination compensation parameter according to an embodiment of the present disclosure. In this embodiment, one illumination compensation parameter set (A, b) for the target block is derived, and the same parameter is applied to all subblocks in the target block. In other words, the entire target block is modified with one illumination compensation parameter set.

As shown in FIG. 11A, the inter-predictor 124 of the video encoding apparatus may determine the position of the reference block in the reference picture using the affine motion vector of the subblock located at the top left of the target block or the top-left corner control point motion vector of the target block. The pre-reconstructed samples around the determined reference block are used for parameter derivation. Alternatively, as shown in FIG. 11B, the position of the reference block may be determined using the affine motion vector of the center subblock in the target block. Once the position of the reference block is determined, the illumination compensation parameter is derived using the pre-reconstructed samples adjacent to the top and left sides of the reference block and the corresponding pre-reconstructed samples adjacent to the top and left sides of the target block.

As another example, a plurality of subblocks in the target block may be used. As shown in FIG. 11C, the inter-predictor 124 determines a reference subblock corresponding to each boundary subblock using affine motion vectors of the subblocks (boundary subblocks) located at the boundary in the target block. Samples for deriving the illumination compensation parameter are extracted from pre-reconstructed samples adjacent to the boundary subblocks in the target block and the corresponding reference subblocks, respectively. For the subblocks located at the top boundary in the target block and the corresponding reference subblocks, the samples are extracted from pre-reconstructed samples adjacent to the top side. For the subblocks located at the left boundary in the target block and the corresponding reference subblocks, the samples are extracted from pre-reconstructed samples adjacent to the left side.

One or more coding tools described above may be used to improve the prediction performance of inter-prediction. To address issues such as complexity or delay, applying some coding tools may require the other coding tools to be excluded from being applied.

Meanwhile, both the sample-by-sample adjustment for affine prediction samples and the bi-directional optical flow are techniques for modifying the predicted samples after the prediction and use gradients of the samples for the modification. Accordingly, in order to reduce the computational complexity and hardware complexity, the equation for the bi-directional optical flow may be modified in the form of the equation for sample-by-sample adjustment for affine prediction samples in bi-directional prediction. Alternatively, the equation for sample-by-sample adjustment for affine prediction samples in bi-directional prediction may be modified in the form of the equation for the bi-directional optical flow.

By substituting Equation 9 into Equation 10, the equation for obtaining the final predicted sample in the bi-directional optical flow may be expressed as follows.

$$I'(i,j) = \text{clip3}\begin{pmatrix} 0, 1023, \\ (I0(i,j) + I1(i,j) + \\ (((g_{x1}(i,j) - g_{x0}(i,j)) * v_x(i,j) + (g_{y1}(i,j) - \\ g_{y0}(i,j)) * v_y(i,j) + 1) \gg 1) + \\ 16400) \gg 5 \end{pmatrix} \quad \text{[Equation 19]}$$

Equation 19 is expressed in the form of Equation 16 as follows.

[Equation 20]
$$I'(i,j) = \text{clip3}\begin{pmatrix} 0, 1023, \\ (I0(i,j) + \text{clip3}(-2^{13}, 2^{13}-1, (((-g_{x0}(i,j)) * v_x(i,j) + \\ (-g_{y0}(i,j)) * v_y(i,j) + 1) \gg 1)) + \\ (I1(i,j) + \text{clip3}(-2^{13}, 2^{13}-1, ((g_{x1}(i,j) * v_x(i,j) + \\ g_{y1}(i,j) * v_y(i,j) + 1) \gg 1) + \\ 16400 \gg 5 \end{pmatrix}$$

In other words, the final predicted sample to which the bi-directional optical flow is applied may be calculated through Equation 20 instead of Equation 19. Since Equation 20 is expressed in a form similar to the sample-by-sample adjustment technique for the affine predicted samples, there is no need to separately design hardware for implementing the equation according to the bi-directional optical flow technique. In addition, since Equation 20 is expressed in the form of an average of the predicted block from the reference pictures in reference picture list 0 and the predicted block from the reference pictures in reference picture list 1, hardware design is simplified.

In addition, a motion vector precision of the motion offset (optical flow) ($v_x$, $v_y$) of the bidirectional optical flow technique and a motion vector precision of the motion offset ($\Delta mv_x$, $\Delta mv_y$) of the sample-by-sample adjustment technique for the affine prediction sample may be matched with each other. For example, both of the motion offsets of the two techniques may be expressed with a precision of 1/32 subsample units.

It should be understood that the embodiments described above may be implemented in many different ways. The functions described in one or more examples may be implemented in hardware, software, firmware, or any combination thereof. It should be understood that the functional components described herein have been labeled " . . . unit" to further emphasize their implementation independence.

Various functions or methods described in the present disclosure may be implemented with instructions stored in a non-transitory recording medium that can be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although embodiments have been described for illustrative purposes, those having ordinary skill in the art should appreciate that various modifications and changes are possible, without departing from the idea and scope of the embodiments. Embodiments have been described for the sake of brevity and clarity. Accordingly, one of ordinary skill should understand that the scope of the embodiments is not limited by the embodiments explicitly described above but includes the claims and equivalents thereto.

What is claimed is:

1. A video decoding method for reconstructing a target block in a current picture to be decoded, the video decoding method comprising:
    determining first and second reference pictures and first and second motion vectors for bi-prediction by decoding a bitstream;
    generating a first reference block from the first reference picture referenced by the first motion vector and generating a second reference block from the second reference picture referenced by the second motion vector;
    generating a prediction block of the target block using the first and second reference blocks;
    generating a residual block of the target block based on a residual signal decoded from the bitstream; and
    reconstructing the target block based on the prediction block of the target block and the residual block of the target block,
    wherein the prediction block of the target block is generated by performing a bi-directional optical flow process using the first and second reference blocks,
    wherein the bi-directional optical flow process is not executed when luma weights assigned to each of the first and second reference pictures for prediction of a luma component of the target block are different from each other,
    wherein the bi-directional optical flow process is not executed when chroma weights assigned to each of the first and second reference pictures for prediction of a chroma component of the target block are different from each other,
    wherein, when the bi-directional optical flow process is executed, generating the prediction block includes, for a subblock split from the target block
        generating first horizontal gradients and first vertical gradients for respective luma samples of a subblock in the first reference block corresponding to the subblock of the target block,
        generating second horizontal gradients and second vertical gradients for respective luma samples of a subblock in the second reference block corresponding to the subblock of the target block,
        calculating a motion offset corresponding to the subblock of the target block using the first and second horizontal gradients and the first and second vertical gradients for the luma samples, and
        predicting luma samples in the subblock of the target block using luma sample values of the subblock of the first reference block, luma sample values of the subblock of the second reference block, and the motion offset, and
    wherein predicting the luma samples in the subblock of the target block includes
        calculating a sample offset of a luma sample position in the subblock of the target block using a difference between first and second horizontal gradients corresponding to the luma sample position, a difference between first and second vertical gradients corresponding to the luma sample position, and the motion offset corresponding to the subblock of the target block, and
        predicting a luma sample of the luma sample position using luma sample values in the first and second reference blocks corresponding to the luma sample position and the sample offset of the luma sample position.

2. The video decoding method of claim 1, further comprising:
    predicting the luma component of the target block by applying, to the first reference block and the second reference block, the luma weights respectively corresponding thereto, when the luma weights assigned to each of the first and second reference pictures are different from each other, and
    predicting the chroma component of the target block by applying, to the first reference block and the second reference block, the chroma weights respectively corresponding thereto, when the chroma weights assigned to each of the first and second reference pictures are different from each other.

3. The video decoding method of claim 1, wherein, when the bi-directional optical flow process is executed, generating the prediction block further comprises, for the subblock of the target block:
    generating third horizontal gradients and third vertical gradients for respective chroma samples of the subblock of the first reference block;
    generating fourth horizontal gradients and fourth vertical gradients for respective chroma samples of the subblock of the second reference block;
    calculating a sample offset for a chroma sample position in the subblock of the target block by using a difference between the third and fourth horizontal gradients corresponding to the chroma sample position, a difference between the third and fourth vertical gradients corresponding to the chroma sample position, and the motion offset corresponding to the subblock of the target block; and
    predicting a chroma sample of the chroma sample position using chroma sample values in the first and second reference blocks corresponding to the chroma sample position and the sample offset of the chroma sample position.

4. The video decoding method of claim 1, further comprising:
performing a weight-averaging process for an inter-prediction block and an intra-prediction block to thereby generate the prediction block of the target block,
wherein the inter-prediction block is generated using the first reference block and the second reference block, and the intra-prediction block is generated by performing intra-prediction on the target block, and
wherein execution of the weight-averaging process limits execution of the bi-directional optical flow process.

5. The video decoding method of claim 4, wherein when the weight-averaging process is executed, the intra-prediction block is generated using a planar mode, among a plurality of intra-prediction modes.

6. The video decoding method of claim 4, wherein a weight value used for the weight-averaging process is determined by the number of intra-predicted blocks among neighboring blocks including left and top blocks of the target block.

7. A video encoding method for encoding a target block in a current picture to be encoded, the video encoding method comprising:
determining a first motion vector and a second motion vector for bi-direction;
generating a first reference block from a first reference picture referenced by the first motion vector and generating a second reference block from a second reference picture referenced by the second motion vector;
generating a prediction block of the target block using the first and second reference blocks; and
generating a residual block based on the prediction block of the target block, and encoding the residual block,
wherein the prediction block of the target block is generated by performing a bi-directional optical flow process using the first and second reference blocks,
wherein the bi-directional optical flow process is not executed when luma weights assigned to each of the first and second reference pictures for prediction of a luma component of the target block are different from each other,
wherein the bi-directional optical flow process is not executed when chroma weights assigned to each of the first and second reference pictures for prediction of a chroma component of the target block are different from each other,
wherein, when the bi-directional optical flow process is executed, generating the prediction block includes, for a subblock split from the target block
generating first horizontal gradients and first vertical gradients for respective luma samples of a subblock in the first reference block corresponding to the subblock of the target block,
generating second horizontal gradients and second vertical gradients for respective luma samples of a subblock in the second reference block corresponding to the subblock of the target block,
calculating a motion offset corresponding to the subblock of the target block using the first and second horizontal gradients and the first and second vertical gradients for the luma samples, and
predicting luma samples in the subblock of the target block using luma sample values of the subblock of the first reference block, luma sample values of the subblock of the second reference block, and the motion offset, and
wherein predicting the luma samples in the subblock of the target block includes
calculating a sample offset of a luma sample position in the subblock of the target block using a difference between first and second horizontal gradients corresponding to the luma sample position, a difference between first and second vertical gradients corresponding to the luma sample position, and the motion offset corresponding to the subblock of the target block, and
predicting a luma sample of the luma sample position using luma sample values in the first and second reference blocks corresponding to the luma sample position and the sample offset of the luma sample position.

8. The video encoding method of claim 7, wherein, when the bi-directional optical flow process is executed, generating the prediction block further comprises, for the subblock of the target block:
generating third horizontal gradients and third vertical gradients for respective chroma samples of the subblock of the first reference block;
generating fourth horizontal gradients and fourth vertical gradients for respective chroma samples of the subblock of the second reference block;
calculating a sample offset of a chroma sample position in the subblock of the target block using a difference between the third and fourth horizontal gradients corresponding to the chroma sample position, a difference between the third and fourth vertical gradients corresponding to the chroma sample position, and the motion offset corresponding to the subblock of the target block; and
predicting a chroma sample of the chroma sample position using chroma sample values in the first and second reference blocks corresponding to the chroma sample position and the sample offset of the chroma sample position.

9. The video encoding method of claim 7, further comprising:
performing a weight-averaging process for an inter-prediction block and an intra-prediction block to thereby generate the prediction block of the target block,
wherein the inter-prediction block is generated using the first reference block and the second reference block, and the intra prediction block is generated by performing intra prediction on the target block, and
wherein execution of the weight-averaging process limits execution of the bi-directional optical flow process.

10. The video encoding method of claim 9, wherein a weight used for the weight averaging process is determined by the number of intra predicted blocks, among neighboring blocks including left and top blocks of the target block.

11. A method for transmitting a bitstream containing encoded video data, the method comprising:
generating the bitstream based on predicting a target block in a current picture; and
transmitting the bitstream to a video decoding apparatus,
wherein generating the bitstream includes
determining a first motion vector and a second motion vector for bi-direction,
generating a first reference block from a first reference picture referenced by the first motion vector and generate a second reference block from a second reference picture referenced by the second motion vector, generating a prediction block of the target block by performing a bi-directional optical flow process using the first and second reference blocks, generating a residual block based on the prediction block of the target block, and encoding the residual block into the bitstream, wherein the bi-directional optical flow process is not executed when luma weights assigned to each of the first and second reference pictures for prediction of a luma component of the target block are different from each other, wherein the bi-directional optical flow process is not executed when chroma weights assigned to each of the first and second reference pictures for prediction of a chroma component of the target block are different from each other, wherein, when the bi-directional optical flow process is executed, generating the prediction block includes, for a subblock split from the target block generating first horizontal gradients and first vertical gradients for respective luma samples of a subblock in the first reference block corresponding to the subblock of the target block, generating second horizontal gradients and second vertical gradients for respective luma samples of a subblock in the second reference block corresponding to the subblock of the target block, calculating a motion offset corresponding to the subblock of the target block using the first and second horizontal gradients and the first and second vertical gradients for the luma samples, and predicting luma samples in the subblock of the target block using luma sample values of the subblock of the first reference block, luma sample values of the subblock of the second reference block, and the motion offset, and wherein predicting the luma samples in the subblock of the target block includes calculating a sample offset of a luma sample position in the subblock of the target block using a difference between first and second horizontal gradients corresponding to the luma sample position, a difference between first and second vertical gradients corresponding to the luma sample position, and the motion offset corresponding to the subblock of the target block, and predicting a luma sample of the luma sample position using luma sample values in the first and second reference blocks corresponding to the luma sample position and the sample offset of the luma sample position.

* * * * *